United States Patent
Li et al.

(10) Patent No.: US 11,789,985 B2
(45) Date of Patent: Oct. 17, 2023

(54) METHOD FOR DETERMINING COMPETITIVE RELATION OF POINTS OF INTEREST, DEVICE

(71) Applicant: BEIJING BAIDU NETCOM SCIENCE AND TECHNOLOGY CO., LTD., Beijing (CN)

(72) Inventors: Shuangli Li, Beijing (CN); Jingbo Zhou, Beijing (CN); Tong Xu, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 17/480,780

(22) Filed: Sep. 21, 2021

(65) Prior Publication Data
US 2022/0075808 A1    Mar. 10, 2022

(30) Foreign Application Priority Data
Sep. 25, 2020 (CN) .......................... 202011025731.3

(51) Int. Cl.
*G06F 16/29* (2019.01)
*G06F 16/9536* (2019.01)

(52) U.S. Cl.
CPC .......... *G06F 16/29* (2019.01); *G06F 16/9536* (2019.01)

(58) Field of Classification Search
CPC .. G06F 16/29; G06F 16/9536; G06F 16/9537; G06F 16/9535; G06F 40/216; G06F 40/289; G06F 40/30; G06N 3/045; G06N 3/08
See application file for complete search history.

(56) References Cited

U.S. PATENT DOCUMENTS

2015/0187107 A1* 7/2015 Vander Mey .......... G06Q 50/01
                                                          345/629
2019/0354937 A1   11/2019 Bhageria et al.

FOREIGN PATENT DOCUMENTS

CN         110633406 A      12/2019

OTHER PUBLICATIONS

Extended European Search Report issued in corresponding EP Application No. 21163766.5 dated Jul. 21, 2021 (7 pages).

* cited by examiner

*Primary Examiner* — Albert M Phillips, III
(74) *Attorney, Agent, or Firm* — Osha Bergman Watanabe & Burton LLP

(57) ABSTRACT

A method for determining a competitive relation of Points of Interest (POI), and a device are provided in the present disclosure. The specific implementation includes: determining POI representation data between two target POIs based on service-related data of the target POIs; and determining a competitive relation between the target POIs based on the POI representation data.

9 Claims, 8 Drawing Sheets

METHOD FOR DETERMINING COMPETITIVE RELATION OF POINTS OF INTEREST, DEVICE

CROSS-REFERENCE TO RELATED APPLICATIONS

This application claims the benefit of priority to Chinese Application No. 202011025731.3, filed on Sep. 25, 2020, the contents of which are incorporated herein by reference in their entirety.

TECHNICAL FIELD

The present disclosure relates to a field of data processing technology, especially involving artificial intelligence and big data technology, and particularly to a method for determining a competitive relation of Points of Interest (POI), and a device.

BACKGROUND

In the geographic information system, POI (Point of Interest) refers to a geographic object that the user interests in, that is a physical object, such as a park, a supermarket, a store and so on. In real life, users often need to choose among multiple POIs based on considerations in many aspects when going out, so that different POIs form a competitive relation.

When POI data is processed, it tends to focus more on a paradigmatic relation between POIs, making the analysis of the POI competitive relation still in its infancy. It is usually realized by manual experience or statistical methods, with poor accuracy and relatively low determining efficiency.

SUMMARY

A method for determining a competitive relation of Points of Interest (POI), and a device are provided.

According to a first aspect of the present disclosure, there is provided a method for determining a competitive relation of POIs, including: determining POI representation data between two target POIs based on service-related data of the two target POIs; and determining a competitive relation between the two target POIs based on the POI representation data.

According to another aspect of the present disclosure, there is provided an electronic device, including: at least one processor, and a memory communicatively coupled to the at least one processor. The memory is configured to store instructions executable by the at least one processor. When the instructions are executed by the at least one processor, the at least one processor is configured to execute any method for determining a competitive relation of POIs in the embodiments of the present disclosure.

It is to be understood that the content in this part is not intended to identify key or important features of the embodiments of the present disclosure, and does not limit the scope of the present disclosure. Other features of the present disclosure will be easily understood through the following specification.

BRIEF DESCRIPTION OF THE DRAWINGS

The drawings are used to better understand the solution, and are not restrictive of the disclosure, as claimed.

DETAILED DESCRIPTION

The following describes exemplary embodiments of the present disclosure with reference to the attached drawings, which include various details of the embodiments of the present disclosure to facilitate understanding, and they should be considered as merely exemplary. Therefore, those skilled in the art should realize that various changes and modifications can be made to the embodiments described herein without departing from the scope and spirit of the present disclosure. Similarly, for clarity and conciseness, descriptions of well-known functions and structures are omitted in the following description.

The method for determining a competitive relation of POIs and the apparatus for determining a competitive relation of POIs provided in the embodiments of the present disclosure are suitable for predicting the competitive relation of POIs in the field of big data technology. The method for determining a competitive relation of POIs may be executed by the apparatus for determining a competition relation of POIs, which is implemented by software and/or hardware, and is specifically configured in an electronic device.

Figure 1:
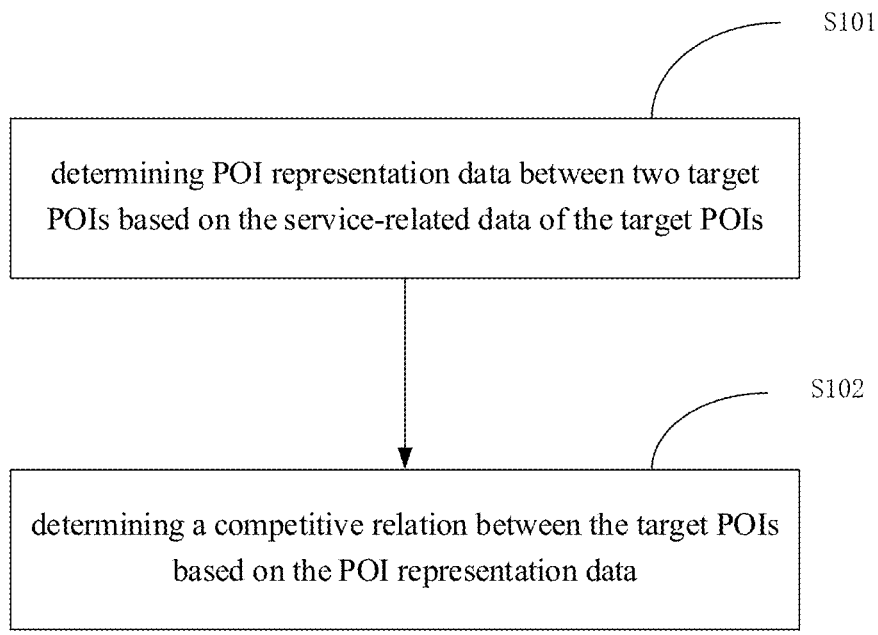
FIG. 1 is a flow chart illustrating a method for determining a competitive relation of POIs according to an example embodiment.

FIG. 1 is a flow chart illustrating a method for determining a competitive relation of POIs according to an example embodiment, and the method includes the following.

At block S101, POI representation data between two target POIs are determined based on service-related data of the two target POIs.

The target POIs can be understood as two POIs for which a competitive relation is predicted. The service-related data can be understood as structural data associated with functional service provided by target POIs, in which, the functional service includes commodity service and/or experience service provided by the target POIs. For example, dishes sold in a restaurant can be considered as commodity service, and the environment and service attitude of a waiter in the restaurant can be considered as experience service.

Alternatively, the service-related data may be pre-stored locally in an electronic device, other storage devices associated with the electronic device, or the cloud. Correspondingly, when the competitive relation of the POIs is determined, the service-related data is obtained from the electronic device and other storage associated with the electronic device or the cloud.

Alternatively, as time goes by, the service management related data of the target POIs may change. In order to ensure the accuracy of the determined POI representation data, and lay a foundation for the accuracy of a determination result of the POI competitive relation, it is also possible to determine the service-related data of the target POIs in real time in a process of determining the POI competitive relation.

Exemplarily, the service-related data can be determined according to a similarity relation of comment data of the target POIs, and then the POI representation data between the target POIs can be determined according to the determined service-related data. The comment data of the target POI includes an evaluation of the functional service provided by the target POI after a user visits the target POI.

It is understandable that because the comment data of different target POIs can describe the target POIs at the functional service level, the service-related data determined based on the similarity relation of the comment data of the target POIs can reflect the competitive relation of the target POIs at the functional service level. For example, when the functional services involved in the comment data are the same or similar, it indicates that the services provided by the target POIs are the same or similar. Correspondingly, there is a potential competitive relation between the target POIs.

Since some target POIs contain less comment data, the service-related data determined only based on the comment data of the target POI itself has poor comprehensiveness, which affects the accuracy of the determined POI representation data. In order to avoid the above situation, when the service-related data are determined based on the similarity relation of the comment data of the target POIs, paradigmatic points of the target POIs can be determined. Comment data of the paradigmatic point of the target POI can be regarded as the comment data of the target POI, thereby expanding the data volume of the comment data of the target POI to enrich the comprehensiveness of the service-related data. The paradigmatic point can be brands of the target POI and the like.

In an alternative embodiment, determining the POI representation data between the target POIs based on the service-related data of each target POI may include: determining a POI service representation of each target POI based on the service-related data; and determining the POI representation data between the target POIs based on the POI service representation of each target POI.

Exemplarily, determining the POI service representation of each target POI based on the service-related data may include: adopting a preset feature extraction network to extract the POI service representation in the service-related data of each target POI. Network parameters in the preset feature extraction network can be obtained by training a large amount of sample data. The feature extraction network can be implemented by a machine learning model such as a neural network or a deep learning model in the field of artificial intelligence technology, and this disclosure does not limit the network structure of the feature extraction network.

The above technical solution introduces the service-related data to determine the POI representation data, so that the determined target POI representation data includes an implicit relation between the target POIs at the service level, which lays the foundation of improving the accuracy of the determination result of the competitive relation between the target POIs.

Alternatively, determining the POI representation data between the target POIs based on the POI service representation of each target POI may include: splicing and fusing the POI service representations of the target POIs to obtain the POI representation data between the target POIs, which is used to determine the competitive relation between the target POIs.

It is to be noted that, due to the different types of functional services provided by different target POIs, the size of the corresponding service-related data is different, which leads to different data lengths of the POI service representations that are determined at last. However, directly splicing and fusing two POI service representations with different data lengths will result in data asymmetry if splicing the POI service representations in different orders, leading poor stability of the determination result of the competitive relation. In order to improve the stability of the determination result of the competitive relation, alternatively, the POI representation data between the target POIs is determined according to the POI service representation of each target POI, and an average fully connected layer is further introduced to process the POI service representation of each target POI to eliminate the asymmetry of POI service representations. The network parameters in the POI service representation can be obtained by training a large amount of sample data.

Exemplarily, introducing the average fully connected layer to process the POI service representation of each target POI may include: fusing the POI service representations of respective target POIs according to a first order to obtain first fusion data; fusing the POI service representations of respective target POIs according to a second order to obtain second fusion data; in which the first order is opposite to the second order; and determining the POI representation data based on the first fusion data and the second fusion data.

It is understandable that the first fusion data and the second fusion data are determined by splicing and fusing two POI service representations using a sequential order and a reverse order respectively, and then the POI representation data is determined based on the first fusion data and the second fusion data. The order of the POI service representations of the target POIs is ignored, so that the asymmetry of the POI service representations of different target POIs is eliminated, thereby laying a foundation of improving the stability of the subsequent determination result of the competitive relation.

At block S102, a competitive relation between the target POIs is determined based on the POI representation data.

Exemplarily, the POI representation data can be processed to obtain a prediction probability of the competitive relation;

when the prediction probability is greater than a preset probability threshold, it indicates that there is a competitive relation between the target POIs; when the prediction probability is not greater than the preset probability threshold, it indicates that there is no competitive relation between the target POIs. The preset probability threshold can be determined by technicians according to needs or empirical value, or determined through a large number of experiments.

In the embodiments of the present disclosure, in the process of determining the competitive relation between the target POIs, the POI representation data between the target POIs is introduced, thus an implicit representation of association of the target POIs on the service level is carried in the POI representation data. Since the implicit representation of association on the service level can reflect the competitive relation between the target POIs, for example, the provided services are the same or similar, the competitive relation between the target POIs can be determined based on the implicit representation of association on the service level, which improves the accuracy of the determination result of the competitive relation. In addition, the determination method by using the POI representation data takes the place of the determination method based on the traditional experience or statistics, such that there is no need to invest a lot of time and labor, and the time efficiency of determining the competitive relation between the target POIs is improved.

The above alternative embodiment adopts the similarity relation of the comment data of the target POIs to determine the service-related data in real time. Although this method can ensure the timeliness of the service-related data, it will increase the amount of calculation and also reduce certain calculation efficiency. In order to further improve the efficiency of determining the competitive relation, and reduce the amount of data calculation as much as possible, in an alternative embodiment of the present disclosure, POI priori knowledge may be introduced to determine the service-related data.

Figure 2:
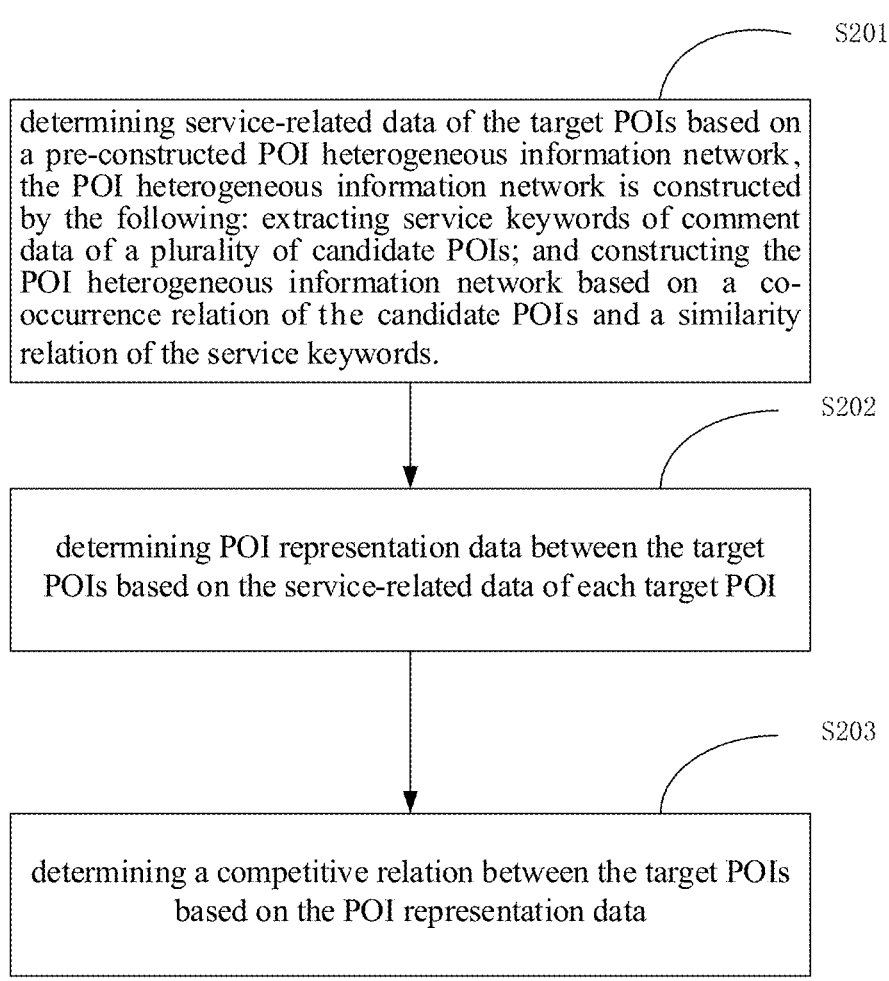
FIG. 2 is a flow chart illustrating another method for determining a competitive relation of POIs according to an example embodiment.

With reference to FIG. 2, the method for determining a competitive relation of POIs may include the following.

At block S201, service-related data of target POIs is determined based on a pre-constructed POI heterogeneous information network. The POI heterogeneous information network is constructed by the following: extracting service keywords of comment data of a plurality of candidate POIs; and constructing the POI heterogeneous information network based on a co-occurrence relation of respective candidate POIs and a similarity relation of the service keywords.

Alternatively, extracting the service keywords of the comment data of the plurality of candidate POIs may include: for each candidate POI, segmenting the comment data of the candidate POI; and determining the service keyword of the candidate POI based on a segmentation result.

Further, in order to avoid an influence of irrelevant words in the segmentation result, when determining the service keyword of the candidate POI based on the segmentation result, a contribution degree of each word segmentation in the segmentation result can be determined; according to a ranking result of the contribution degrees, the service keywords in the segmentation result can be screened. Exemplarily, the contribution degree of each word segmentation in the segmentation result can be represented by the TF-IDF (term frequency-inverse document frequency). Of course, the contribution degree can also be represented by other parameters, which is not limited in the embodiments of the present disclosure.

There may be a small amount of data in the comment data of some candidate POIs. When the service keyword is determined through the comment data of a single candidate POI, the determined service keyword is poor in comprehensiveness, thereby influencing the accuracy of the determination result of the competitive relation. In order to improve the comprehensiveness of the service keywords so as to improve the accuracy of the determination result of the competitive relation, alternatively, extracting the service keywords of the comment data of the plurality of candidate POIs may further include: obtaining paradigmatic comment data associated with a paradigmatic point of each candidate POI; extracting the service keyword from the paradigmatic comment data. The paradigmatic point can be brands of the candidate POIs and the like.

It is understandable that the paradigmatic comment data is regarded as the comment data of the candidate POI by introducing paradigmatic point of the candidate POI, which significantly increases the data volume of the comment data of a single candidate POI, so that the richness and comprehensiveness of the extraction result of the service keyword are improved by extracting the service keyword based on the paradigmatic comment data, thereby laying a foundation for promoting the accuracy of the determination result of the competitive relation.

Due to the large amount of data of candidate POIs when constructing the POI heterogeneous information graph, when too many service keywords are extracted, there will be a lot of redundancy in the POI heterogeneous information graph, and a large amount of data calculations are needed in the process of using the huge POI heterogeneous information graph. In order to reduce the amount of data calculations in the process of using the POI heterogeneous information graph, it is also possible to eliminate those less important service keywords when constructing the POI heterogeneous information graph to reduce the amount of information in the POI heterogeneous information graph.

Exemplarily, when extracting the service keywords from the paradigmatic comment data, the service keywords can be screened, thereby reducing the number of extracted service keywords so as to achieve the purpose of reducing the amount of information in the POI heterogeneous information graph. Specifically, segmentation can be performed on the paradigmatic comment data, and a contribution degree of each word segmentation in the segmentation result can be determined; according to a ranking result of the contribution degrees, the service keywords in the segmentation result can be screened. The contribution degree of each word segmentation in the segmentation result can be represented by the TF-IDF. Of course, the contribution degree can also be represented by other parameters, which is not limited in the embodiments of the present disclosure.

For example, for each candidate POI, the brand associated with the candidate POI can be obtained; the comment data of each POI under the brand can be regarded as paradigmatic comment data to describe a semantic feature of the brand. Since the paradigmatic comment data includes a large number of words, in which the words that can reflect the functional services of the brand are service keywords, it is necessary to mine the service keywords from the paradigmatic comment data. Alternatively, the paradigmatic comment data are segmented, and meaningless words in the segmentation result are eliminated to update the segmentation result; the contribution degree (such as TF-IDF) of each word segmentation in the segmentation result is determined, and the word segmentation with a higher contribution degree is selected as the service keyword.

The co-occurrence relation of candidate POIs can be understood as at least two candidate POIs being co-searched or co-visited by users in the same time period. Correspondingly, the co-occurrence relation can be determined by at least one of user search data, user visit data, and a POI spatial distance.

Alternatively, based on the user search data, it can be determined that at least two candidate POIs co-searched by the users within a first preset time period have a co-occurrence relation; or alternatively, based on the user visit data, it can be determined that at least two candidate POIs co-visited by the users within a second preset time period have a co-occurrence relation; or alternatively, based on POI spatial distribution data, it can be determined that the two candidate POIs whose POI spatial distance is less than a preset distance threshold have a co-occurrence relation. The first preset time period, the second preset time period, and the preset distance threshold can be determined by technicians according to needs or empirical values, and can also be determined through a large number of experiments. The duration of the first preset time period and the second preset time period may be the same or different.

In order to reduce noise interference and meanwhile reduce the scale of the POI heterogeneous information network constructed later, the co-occurrence relations can also be screened. Alternatively, for the co-occurrence relation determined by co-search, a search times threshold can be set, and the co-occurrence relation corresponding to the search times that is less than the search times threshold can be deleted; or alternatively, for the co-occurrence relation determined by co-visit, a visit times threshold can be set, and the co-occurrence relation corresponding to the visit times that is less than the visit times threshold can be deleted. The search times threshold and the visit times threshold can be determined by technicians according to needs or empirical values, or determined through a large number of experiments.

The similarity relation of the service keywords can be understood as a similarity relation determined based on a similarity between the service keywords. Exemplarily, a semantic similarity can be used to represent the similarity relation between different service keywords.

Figure 3:
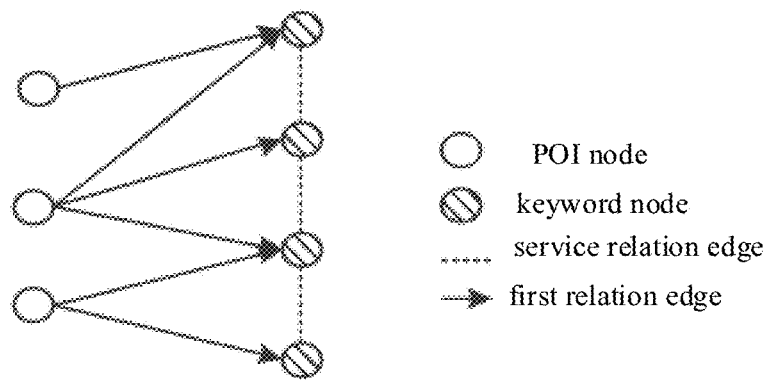
FIG. 3 is a schematic diagram illustrating a POI heterogeneous information network according to an example embodiment.

In order to clearly introduce the POI heterogeneous information network constructed based on the co-occurrence relation of respective candidate POIs and the similarity relation of service keywords, reference may be made to the schematic diagram of a POI heterogeneous information network illustrated in FIG. 3 to describe the structure of the heterogeneous information network in detail.

The POI heterogeneous information network includes nodes and relation edges. The nodes include POI nodes corresponding to the candidate POIs and keyword nodes corresponding to the service keywords. The relation edges include service relation edges, each used to represent an association between the keyword nodes; the relation edges also include first relation edges, each used to represent an association between the POI node and the keyword node. In order to represent the strength of the relation between the keyword nodes connected by the service relation edge, a service edge attribute is also introduced.

In an alternative embodiment, constructing the POI heterogeneous information network based on the co-occurrence relation of respective candidate POIs and the similarity relation of the service keywords may include: constructing a service relation edge between keyword nodes of service keywords based on the similarity relation of the service keywords; constructing a first relation edge between a POI node of the candidate POI and the keyword node of the service keyword based on an ownership between the service keyword and the candidate POI; and determining a service edge attribute of each service relation edge based on a similarity between the service keywords associated with the service relation edge (i.e., a similarity between the service keywords corresponding to the keyword nodes connected by the service relation edge). Correspondingly, based on the pre-constructed POI heterogeneous information network, determining the service-related data of the target POIs includes: determining target keyword nodes associated with the target POIs based on the first relation edge in the POI heterogeneous information network; determining the service-related data in a service type of the target POIs based on the service edge attribute of the service relation edge between the target keyword nodes.

It is understandable that through the above technical solution, the POI heterogeneous information network can be constructed on the basis of determining the service keyword of the candidate POI itself, and then the service-related data can be determined based on the constructed POI heterogeneous information network. It provides data support for the subsequent determination of the POI service representation, and lays the foundation for the determination of the POI competitive relation.

In another alternative embodiment, constructing the POI heterogeneous information network based on the co-occurrence relation of respective candidate POIs and the similarity relation of the service keywords may also include: constructing a service relation edge between keyword nodes of the service keywords based on the similarity relation of the service keywords; constructing a first relation edge between a POI node of the candidate POI and a keyword node of the service keyword based on a consistency of paradigmatic points to which the candidate POI and the service keyword belong; and determining a service edge attribute of each service relation edge based on a similarity between service keywords associated with the service relation edge. Correspondingly, based on the pre-constructed POI heterogeneous information network, determining the service-related data of the target POIs includes: determining target keyword nodes associated with the target POIs based on the first relation edge and the service relation edge in the POI heterogeneous information network; determining the service-related data in a service type of the target POIs based on the service edge attribute of the service relation edge between the target keyword nodes.

Exemplarily, when two service keywords have a similarity relation, a service relation edge between the keyword nodes of the service keywords is constructed; when a candidate POI and the service keyword belong to the same paradigmatic point, a first relation edge between the POI node of the candidate POI and the keyword node of the service keyword is constructed; according to the similarity between the two service keywords with a service relation edge therebetween, a service edge attribute is determined. Correspondingly, the target keyword node that has the first relation edge with the target POI is determined, and a neighbor keyword node that has the service relation edge with the target keyword node is also regarded as the target keyword node. According to an attribute value of the service edge attribute between the target keyword nodes, the structured service-related data in the service type of each target POI is constructed. The service-related data in the service type includes implicit relation data at the service level corresponding to the service keyword.

It is understandable that through the above technical solution, the service keywords of the paradigmatic points can be determined on the basis of introducing the paradigmatic points of the candidate POIs, and then the POI heterogeneous information network can be constructed based on the service keywords of the paradigmatic points. It provides data support for the subsequent determination of the POI service representation, and lays the foundation for the determination of the POI competitive relation.

Exemplarily, determining the service edge attribute based on the similarity between service keywords associated with the service relation edge may include: determining a semantic similarity between the service keywords associated with the service relation edge; and regarding the semantic similarity as the service edge attribute.

Alternatively, determining the semantic similarity between the service keywords associated with the service relation edge may include: determining PMI (Pointwise Mutual Information) between the service keywords associated with the service relation edge; and regarding the PMI as the semantic similarity between the service keywords associated with the service relation edge.

Or alternatively, determining the semantic similarity between the service keywords associated with the service relation edge may also include: encoding the service keywords associated with the service relation edge to obtain respective word vectors; configuring a similarity between the word vectors as the semantic similarity.

It is understandable that determining the service edge attribute by introducing semantic similarity may improve the constructing mechanism of the POI heterogeneous information network and lay the foundation for the determination of service-related data. It is to be noted that this disclosure only exemplarily provides two methods for determining the semantic similarity, and at least one of other similarity determination methods in the related art can also be used to determine the semantic similarity. The embodiments of the present disclosure do not make any limits on this.

In order to further reduce noise interference and meanwhile reduce the scale of the POI heterogeneous information network constructed later, the service relation edges can also be screened to eliminate the service relation edge corresponding to the service keywords with weaker association.

Exemplarily, the service relation edge corresponding to the similarity that does not meet a similarity threshold is screened out. Alternatively, after the semantic similarity is determined in the foregoing embodiments, the semantic similarity is compared with a preset similarity threshold; when the semantic similarity is less than the preset similarity threshold, it indicates that an association strength between the two service keywords is weak, so after the service relation edges are constructed, such service relation edge can be eliminated, or when the service relation edges are constructed, the construction of such service relation edge is prohibited; when the semantic similarity is not less than the preset similarity threshold, it indicates that the association strength between the corresponding two service keywords is strong. Therefore, such service relation edge can be retained after the service relation edges are constructed, or the construction of such service relation edge is allowed when the service relation edges are constructed. The similarity threshold can be determined by technicians according to needs or empirical values, or determined through a large number of experiments.

Figure 4:
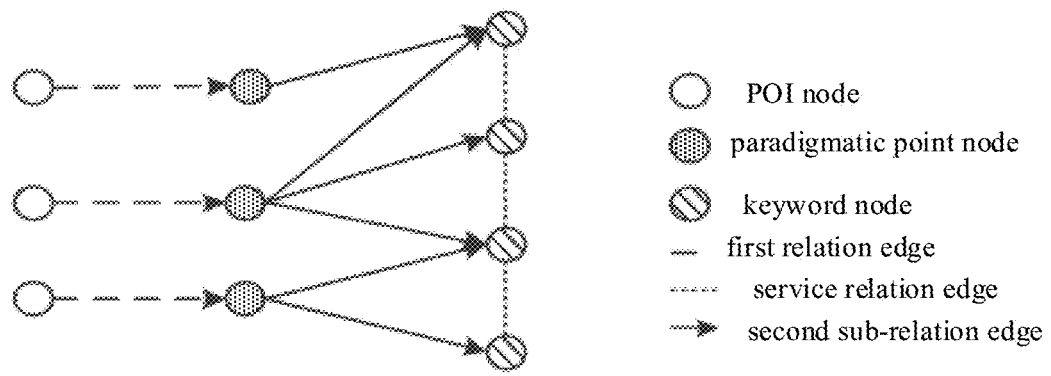
FIG. 4 is a schematic diagram illustrating another POI heterogeneous information network according to an example embodiment.

Referring to the schematic diagram of another POI heterogeneous information network illustrated in FIG. 4, in order to facilitate updating information in the POI heterogeneous information network, a paradigmatic point node corresponding to the paradigmatic point can also be introduced into the POI heterogeneous information network, and relation edges are constructed among the paradigmatic point nodes, the POI nodes and the keyword nodes.

Exemplarily, constructing the first relation edge between the POI node of the candidate POI and the keyword node of the service keyword based on the consistency of paradigmatic points to which the candidate POI and the service keyword belong may include: constructing a first sub-relation edge between the POI node and a paradigmatic point node of the paradigmatic point based on an ownership of the candidate POI and the paradigmatic point; and constructing a second sub-relation edge between a paradigmatic point node of the paradigmatic point and the keyword node based on an ownership of the paradigmatic point and service keyword.

It is understandable that the paradigmatic point node, the first sub-relation edge and the second sub-relation edge are introduced into the POI heterogeneous information network, so that when the POI nodes included in the existing paradigmatic points need to be added, it only needs to establish the first relation edge between the POI node and the paradigmatic point node according to the ownership between the POI and the paradigmatic point and on the basis of the existing POI heterogeneous information network, and there is no need to reconstruct the relation edge between the paradigmatic point node and the keyword node, such that the efficiency of updating the POI heterogeneous information network is improved.

Figure 5:
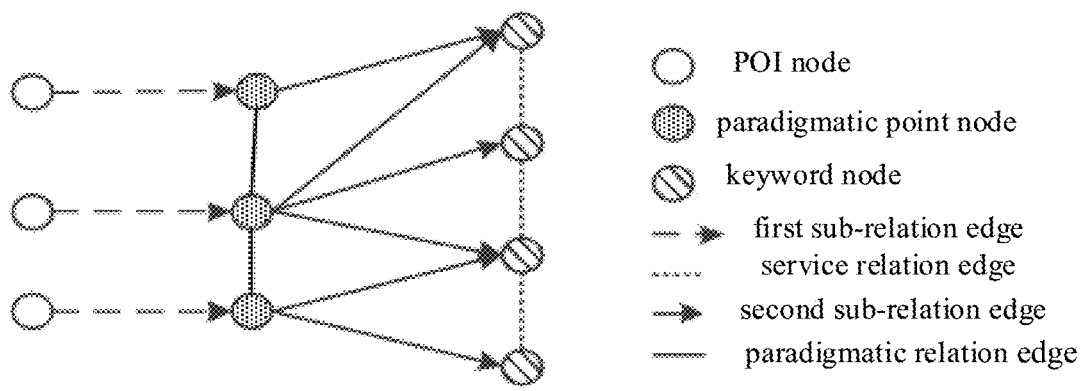
FIG. 5 is a schematic diagram illustrating another POI heterogeneous information network according to an example embodiment.

Referring to the schematic diagram of another POI heterogeneous information network illustrated in FIG. 5, in order to lay a foundation for the richness and comprehensiveness of the determination result of the service-related data, when constructing the POI heterogeneous information network, in an alternative embodiment, a second edge attribute of the second sub-relation edge and a paradigmatic edge attribute of a paradigmatic relation edge are also introduced.

Exemplarily, constructing the POI heterogeneous information network also includes the following: constructing a paradigmatic relation edge between paradigmatic point nodes of paradigmatic points to which candidate POIs belong based on the co-occurrence relation between the candidate POIs; determining a paradigmatic edge attribute of each paradigmatic relation edge based on connected data between the paradigmatic points associated with the paradigmatic relation edge; and determining a second edge attribute of each second sub-relation edge based on a contribution degree of the service keyword associated with the second sub-relation edge to paradigmatic comment data of the paradigmatic point associated with the second sub-relation edge. Correspondingly, based on the pre-constructed POI heterogeneous information network, determining the service-related data of the target POIs also includes: respectively determining target paradigmatic point nodes and target keyword nodes associated with the target POIs based on the first sub-relation edge and the second sub-relation edge; determining service-related data of a paradigmatic type of the target POIs based on the paradigmatic edge attribute between the target paradigmatic point nodes; and determining service-related data of a dissimilar node type of the target POIs based on the second edge attribute between the paradigmatic point node and the target keyword node.

It is understandable that introducing the paradigmatic relation edge between the paradigmatic nodes, the paradigmatic edge attribute of the paradigmatic relation edge, and the second edge attribute of the second sub-relation edge into the POI heterogeneous information network provides data support for the determination of the service-related data in the paradigmatic type and the dissimilar node type, so as to obtain the service-related data in the paradigmatic type that can represent the target POI at the paradigmatic point level, and the service-related data in the dissimilar node type that can represent the target POI at the paradigmatic point and functional service interaction level, such that the richness and comprehensiveness of the service-related data may be improved, and the foundation may be laid for the improvement of the accuracy of the determination result of the POI representation data, and further a guarantee may be provided for the accuracy of the determination result of the POI competitive relation.

In an embodiment, determining the paradigmatic edge attribute based on the connected data between paradigmatic points associated with the paradigmatic relation edge may include: determining a number of meta-paths between the paradigmatic points associated with the paradigmatic relation edge; and determining the paradigmatic edge attribute based on the number of meta-paths. The meta-path refers to a path connected by the paradigmatic point nodes (in which the paradigmatic point nodes are connected by the paradigmatic relation edge) via the POI node of the candidate POI and/or a POI relation edge between the POI nodes. The POI relation edge is constructed based on the co-occurrence relation between respective candidate POIs.

The paradigmatic edge attribute is used to represent an association strength between the paradigmatic points associated with paradigmatic relation edge. The larger the attribute value of the paradigmatic edge attribute is, the stronger the association strength between the paradigmatic points associated with the paradigmatic relation edge is; and the smaller the attribute value of the paradigmatic edge attribute is, the weaker the association strength between the paradigmatic points associated with the paradigmatic relation edge is. It is understandable that by introducing the paradigmatic edge attribute, the association strength between the paradigmatic points can be quantified, and the amount of information in the service-related data is further enriched, thereby improving the richness and comprehensiveness of the content carried by the POI representation data, and further providing a guarantee for the accuracy of the determination result of the POI competitive relation.

Alternatively, determining the paradigmatic edge attribute based on the number of the meta-paths may include: directly regarding the number of meta-paths as the paradigmatic edge attribute.

Since the number of meta-paths is related to the number of POI nodes, when there are a large number of POI nodes connected by the paradigmatic point node, that is, when the paradigmatic point contains a large number of candidate POIs, a situation that the association strength between the paradigmatic points is weak but the attribute value of the paradigmatic edge attribute is relatively large may occur, which will affect the accuracy of the POI competitive relation that is determined at last. In order to avoid the above situation, alternatively, determining the paradigmatic edge attribute based on the number of the meta-paths may also include: determining a number of candidate POI nodes each having the first relation edge with the paradigmatic point node connected by the paradigmatic relation edge, and determining the paradigmatic edge attribute based on the number of the meta-paths and the number of candidate POI nodes.

Exemplarily, the number of candidate POI nodes each having the first relation edge with the paradigmatic point node connected by the paradigmatic relation edge is determined; and the number of meta-paths is standardized by the number of candidate POI nodes, and the standardized result is regarded as the attribute value of the paradigmatic edge attribute.

Specifically, a product of a square root of the number of candidate POI nodes is determined to obtain a standardization factor; and a ratio of the number of meta-paths to the standardization factor is determined, and the ratio is regarded as the attribute value of the paradigmatic edge attribute.

In S202, POI representation data between the target POIs is determined based on the service-related data of each target POI.

In an alternative embodiment, determining the POI representation data between the target POIs based on the service-related data of each target POI may include: determining a POI service representation based on the service-related data; and determining the POI representation data between the target POIs based on the POI service representation of each target POI.

Exemplarily, determining the POI service representation based on the service-related data may include: adopting a preset feature extraction network to extract the POI service representation in the service-related data of each target POI. Network parameters in the preset feature extraction network can be obtained by training of a large amount of sample data. The feature extraction network can be implemented by a machine learning model such as a neural network or a deep learning model, and this disclosure does not limit the network structure of the feature extraction network.

In an alternative embodiment, determining the POI representation data between the target POIs based on the service-related data of each target POI may include: determining a POI service representation based on the service-related data in a service type; and determining the POI representation data between the target POIs based on the POI service representation of each target POI.

Exemplarily, determining the POI service representation based on the service-related data may include: adopting a preset feature extraction network to extract the POI service representation in the service-related data of each target POI. Network parameters in the preset feature extraction network can be obtained by training of a large amount of sample data. Alternatively, a graph convolutional network may be used to perform feature extraction on the POI heterogeneous information network illustrated in FIG. 3 or FIG. 4 to obtain the POI service representation. Alternatively, the graph convolutional network can be implemented based on R-GCN (Relational graph convolutional network). It is to be noted that the embodiments of the present disclosure do not make any limits on the number of graph convolutional networks. For example, at least the graph convolutional networks in two cascades can be used to form a network group, and the network group can be used to perform feature extraction on the POI heterogeneous information network illustrated in FIG. 3 or FIG. 4 to obtain the POI service representation.

In another alternative embodiment, determining the POI representation data between the target POIs based on the service-related data of each target POI may include: determining a POI service representation based on service-related data in the service type and service-related data in a dissimilar node type; determining a POI paradigmatic representation based on service-related data in a paradigmatic type and the service-related data in the dissimilar node type;

updating the POI service representation based on the POI paradigmatic representation; and determining POI representation data between the target POIs based on the POI service representation of each target POI.

Exemplarily, determining the POI service representation based on the service-related data may include: adopting a service representation extraction module in the preset feature extraction network to extract a POI service representation in the service-related data of each target POI, and extracting a POI paradigmatic representation in the service-related data of each target POI by adopting a paradigmatic representation extraction module in the preset feature extraction network; and updating the POI service representation using the POI paradigmatic representation. The network parameters in the preset feature extraction network can be obtained by training a large amount of sample data. Alternatively, a graph convolutional network may be used to perform feature extraction on the POI heterogeneous information network illustrated in FIG. 5 to obtain the POI service representation and the POI paradigmatic representation. Alternatively, the graph convolutional network can be implemented based on the R-GCN network. It is to be noted that the embodiments of the present disclosure do not make any limits on the number of graph convolutional networks. For example, at least the graph convolutional networks in two cascades can be used to form a network group, and the network group can be used to perform feature extraction on the POI heterogeneous information network illustrated in FIG. 5 to obtain the POI service representation and the POI paradigmatic representation.

Exemplarily, determining the POI service representation based on the service-related data in the service type and the service-related data in the dissimilar node type may include: determining a service adjacency matrix and a first dissimilar node adjacency matrix respectively based on the service-related data in the service type and the service-related data in the dissimilar node type; and processing the service adjacency matrix and the first dissimilar node adjacency matrix to obtain the POI service representation.

Specifically, the service adjacency matrix and the first dissimilar node adjacency matrix can be obtained by respectively regularizing the service-related data in the service type and the service-related data in the dissimilar node type. The service-related data in the dissimilar node type may be the service-related data in the paradigmatic type that is different from the service type. According to the service representation extraction module in the graph convolutional network, the service adjacency matrix and the first dissimilar node adjacency matrix are processed to obtain the POI service representation. Regularization processing may adopt the Laplace regularization method or any one of other regularization methods in the related art, which is not limited in the embodiments of the present disclosure.

Exemplarily, determining the POI paradigmatic representation based on the service-related data in the paradigmatic type and the service-related data in the dissimilar node type may include: determining a paradigmatic adjacency matrix and a second dissimilar node adjacency matrix respectively based on the service-related data in the paradigmatic type and the service-related data in the dissimilar node type; and processing the paradigmatic adjacency matrix and the second dissimilar node adjacency matrix to obtain the POI paradigmatic representation.

Specifically, the paradigmatic adjacency matrix and the second dissimilar node adjacency matrix can be obtained by respectively regularizing the service-related data in the paradigmatic type and the service-related data in the dissimilar node type. The service-related data in the dissimilar node type may be the service-related data in the service type that is different from the paradigmatic type. According to the paradigmatic representation extraction module in the graph convolutional network, the paradigmatic adjacency matrix and the second dissimilar node adjacency matrix are processed to obtain the POI paradigmatic representation. Regularization processing may adopt the Laplace regularization method or any one of other regularization methods in the related art, which is not limited in the embodiments of the present disclosure.

The above technical solutions improve the determination mechanism of the POI service representation and the POI paradigmatic representation, which provide data support for the subsequent determination of POI representation data, and lay a foundation for the determination of POI competitive relation.

In the technical solutions of the above alternative embodiments, adopting different determination methods to determine the POI service representation for the service-related data that contains different content structures, which lays the foundation for the determination of the POI representation data, realizes the diversity of the determination of the POI representation data at the same time, improves the determination mechanism of the POI representation data, and provides reliable data support for the determination of POI competitive relation.

Alternatively, updating the POI service representation based on the POI paradigmatic representation may include: splicing and fusing the POI paradigmatic representation and the POI service representation based on a preset sequence to update the POI representation data.

Or alternatively, updating the POI service representation based on the POI paradigmatic representation may include: determining an attention weight based on the POI paradigmatic representation of one target POI and the POI service representation of another target POI; and weighting the POI service representation of the another target POI according to the attention weight to update the POI service representation.

In an alternative embodiment, determining the attention weight based on the POI paradigmatic representation and the POI service representation may include: determining a cosine similarity between the POI paradigmatic representation of one target POI and the POI service representation of another target POI; and determining the attention weight based on the cosine similarity. For example, the cosine similarity can be directly used as the attention weight, alternatively, the cosine similarity can also be standardized, and the cosine similarity obtained after normalization can be used as the attention weight.

It is to be noted that in the process of obtaining the attention weight of one target POI, the above technical solution introduces the POI paradigmatic representation of another target POI, which can distinguish the impact of the another target POI on the one target POI at the paradigmatic level, and strengthen the more influential POI service representation and weaken the less influential POI service representation, so that the semantic feature carried in the last determined service representation of the one target POI has higher association strength with the another target POI, so that the POI representation data determined subsequently can accurately reflect the competitive relation between the POIs, which lays a foundation for the further improvement of the accuracy of the determination result of the POI competitive relation.

Alternatively, on the basis of the technical solutions of the foregoing embodiments, determining the POI representation data between the target POIs based on the POI service representation of each target POI may include: splicing and fusing the POI service representations of the target POIs to obtain the POI representation data between the target POIs, which is used to determine the competitive relation between the target POIs.

It is to be noted that, due to the different types of functional services provided by different target POIs, the size of the corresponding service-related data is different, which leads to different data lengths of the POI service representations that are determined at last. However, directly splicing and fusing two POI service representations with different data lengths will result in data asymmetry due to different orders of splicing and fusing the POI service representations, leading poor stability of the subsequent determination result of the competitive relation. In order to improve the stability of the subsequent determination result of the competitive relation, alternatively, the POI representation data between the target POIs is determined according to the POI service representation of each target POI, and further an average fully connected layer is introduced to process the POI service representation of each target POI to eliminate the asymmetry of POI service representations. The network parameters in the POI service representation can be obtained by training a large amount of sample data.

Exemplarily, introducing the average fully connected layer to process the POI service representation of each target POI may include: according to a first order, fusing the POI service representations of respective target POIs to obtain first fusion data; according to a second order, fusing the POI service representations of respective target POIs to obtain second fusion data; in which the first order is opposite to the second order; and determining the POI representation data according to the first fusion data and the second fusion data.

It is understandable that the first fusion data and the second fusion data are determined by the splicing and fusing two POI service representations using a sequential order and a reverse order respectively, and then the POI representation data is determined based on the first fusion data and the second fusion data. The effect of the order of splicing the POI service representations of the target POIs is ignored, so that the asymmetry of the POI service representations of different target POIs is eliminated, thereby laying a foundation of improving the stability of the subsequent determination result of the competitive relation.

In S203, a competitive relation between the target POIs is determined based on the POI representation data.

In the technical solution of the embodiments of the present disclosure, the determination of the service-related data is refined to determine the service-related data of the target POIs based on the pre-constructed POI heterogeneous information network; in which the POI heterogeneous information network is constructed by the following: extracting service keywords of comment data of the plurality of candidate POIs; and constructing the POI heterogeneous information network based on a co-occurrence relation of the candidate POIs and a similarity relation of the service keywords. Therefore, the priori knowledge of the POI heterogeneous information network can be used to assist the determination of service-related data, without the need for real-time calculation of service-related data, which reduces the amount of data calculations when the service-related data is determined, and at the same time improves the determination efficiency of the service-related data, thereby improving the determination efficiency of the POI competitive relation.

Figure 6:
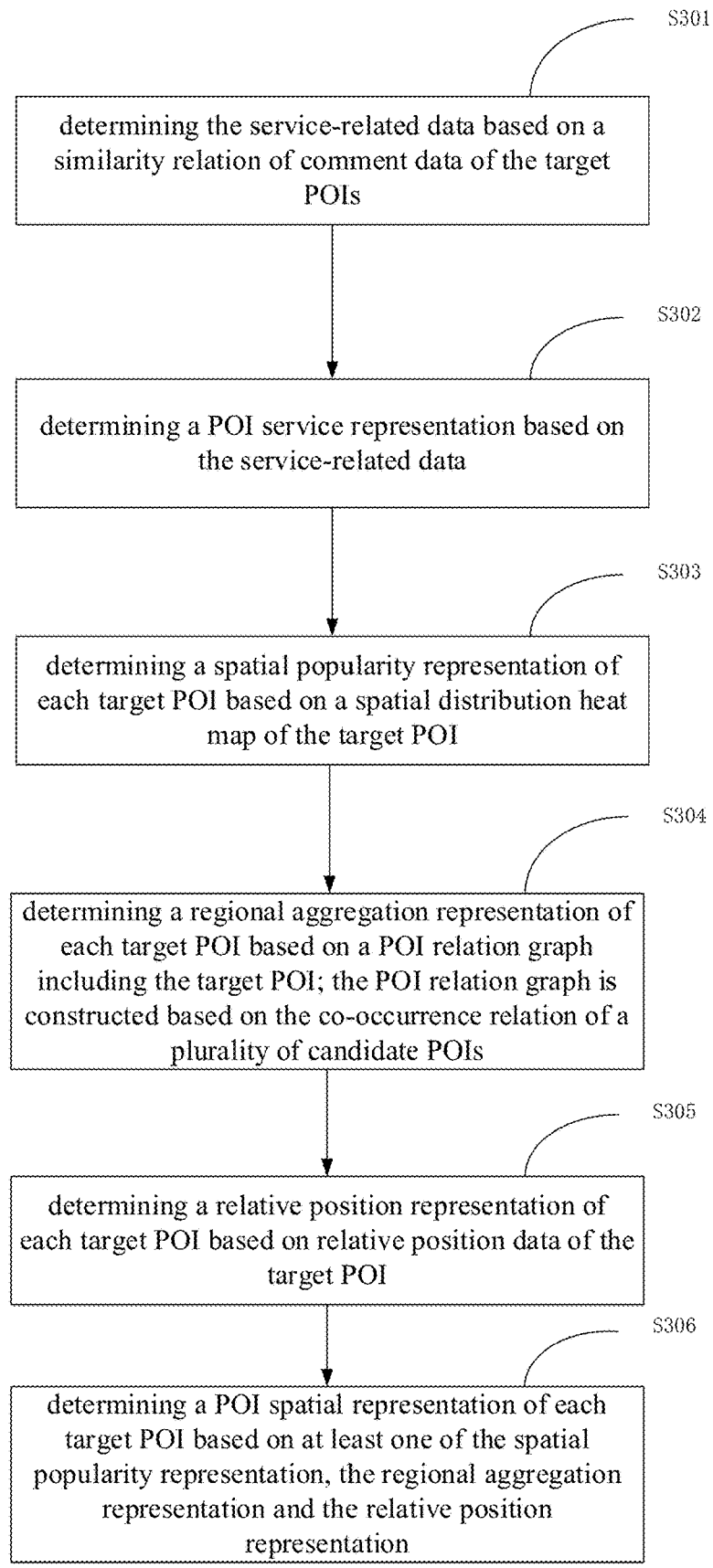
FIG. 6 is a flow chart illustrating another method for determining a competitive relation of POIs according to an example embodiment.

In order to further improve the accuracy of the determination result of the POI competitive relation, in an alternative embodiment, in the process of determining the POI representation data, representation data at a POI attribute level are also introduced. The method for determining a competitive relation of POIs in FIG. 6 includes the following.

At block S301, service-related data of target POIs is determined based on a similarity relation of comment data of the target POIs.

At block S302, a POI service representation is determined based on the service-related data.

At block S303, a spatial popularity representation of each target POI is determined based on a spatial distribution heat map of the target POI.

The spatial distribution heat map is used to represent the popularity of the target POI.

Exemplarily, the spatial distribution heat map of the target POI can be constructed according to features of POIs distributed in the surrounding area of the target POI.

Alternatively, the feature of the POI distributed in the surrounding area of the target POI may be a popularity feature of the POI distributed in the surrounding area of the target POI. The popularity feature may be at least one of access popularity, search popularity, actual access popularity, and click popularity of the POI. The access popularity is used to represent a user's access frequency for the POI. The higher the access frequency is, the higher the access popularity is. The search popularity is used to represent the user's search frequency for the POI. The higher the search frequency is, the higher the search popularity is. The actual access popularity is used to represent a frequency of the user's actual access to the target POI. The higher the frequency of actual access to the POI is, the higher the actual access popularity is. Click popularity is used to represent a frequency that the user clicks to view the POI. The higher the frequency that the user clicks to view the POI is, the higher the click popularity is. The embodiments of the present disclosure do not limit the specific feature type of the POI'S popularity feature. Correspondingly, the spatial distribution heat map may include a spatial distribution of the popularity of each neighboring POI in the area around the target POI, that is, the spatial distribution heat map may reflect the spatial distribution data of the area around the POI.

Exemplarily, the area around the target POI is divided into spatial grids, and a statistical value is determined for a preset feature of the POI distributed in each spatial grid; and the spatial distribution heat map of the target POI is constructed according to a preset feature statistical value of the POI distributed in the spatial grids within the preset area of the target POI. The preset area can be determined by technicians according to needs or empirical value, or determined through a large number of experiments. The preset feature statistical value can be a popularity statistical value.

In the embodiments of the present disclosure, for each target POI, a spatial distribution heat map corresponding to the POI can be constructed according to the popularity features of the POIs distributed in the surrounding area of the target POI. The spatial distribution heat map can be a POI category based multi-channel heat map. It can be seen that the spatial distribution heat map in the embodiments of the present disclosure can fully reflect abundant spatial features of the POIs.

In an alternative embodiment, determining the spatial popularity representation based on the spatial distribution heat map of the target POI may include: based on a preset learning model, determining the spatial popularity representation of the target POI according to the spatial distribution heat map of the target POI. The preset learning model may be a model for learning graph data, such as a graph neural network model, etc. The embodiments of the present disclosure do not limit the specific type of the preset learning model.

In S304, a regional aggregation representation of each target POI is determined based on a POI relation graph including the target POI; in which the POI relation graph is constructed based on a co-occurrence relation of a plurality of candidate POIs.

The POI relation graph can represent the co-occurrence relation between the candidate POIs, and the co-occurrence relation of candidate POIs can be understood as at least two candidate POIs being co-searched or co-visited by users in the same time period. Correspondingly, the co-occurrence relation can be determined by at least one of user search data, user visit data, and a POI spatial distance.

Alternatively, based on the user search data, it can be determined that at least two candidate POIs co-searched by the users within a first preset time period have a co-occurrence relation; or alternatively, based on the user visit data, it can be determined that at least two candidate POIs co-visited by the users within a second preset time period have a co-occurrence relation; or alternatively, based on POI spatial distribution data, it can be determined that the two candidate POIs whose POI spatial distance is less than a preset distance threshold have a co-occurrence relation. The first preset time period, the second preset time period, and the preset distance threshold can be determined by technicians according to needs or empirical values, and can also be determined through a large number of experiments. The duration of the first preset time period and the second preset time period may be the same or different.

In order to reduce noise interference and meanwhile reduce the scale of the POI heterogeneous information network constructed later, the co-occurrence relations can also be screened. Alternatively, for the co-occurrence relation determined by co-search, a search times threshold can be set, and the co-occurrence relation corresponding to the search times that is less than the search times threshold can be deleted; or alternatively, for the co-occurrence relation determined by co-visit, a visit times threshold can be set, and the co-occurrence relation corresponding to the visit times that is less than the visit times threshold can be deleted. The search times threshold and the visit times threshold can be determined by technicians according to needs or empirical values, or determined through a large number of experiments.

In a specific example, a vector $(p_i, p_j, w_{ij})$ can be used to indicate that two POIs $p_i$ and $p_j$ have been retrieved for $w_{ij}$ times by all users within a preset time interval $\Delta t$. When a POI relation graph is initially constructed, an upper threshold $\theta_m$ of retrieval times can be set. When $w_{ij} > \theta_m$, it indicates that there is a co-occurrence relation between the two POIs $p_i$ and $p_j$, and a relation edge between $p_i$ and $p_j$ can be added. For example, $O_m = 0$ can be set. That is, as long as the two POIs $p_i$ and $p_j$ are retrieved by the user within the preset time interval $\Delta t$, it indicates that there is a co-occurrence relation between the two POIs $p_i$ and $p_j$, and a corresponding relation edge can be constructed. At the same time, in order to reduce noise interference and reduce the scale of the POI relation graph, a lower threshold $\theta_n$ of retrieval times can also be set to screen the POI relation with a relatively weak association degree. When $w_{ij} < \theta_n$, the relation edge between $p_i$ and $p_j$ in the final POI relation graph is deleted. For example, $\theta_n = $ "5" can be set, that is, when the value of $w_{ij}$ is less than 5, it indicates that the association degree between $p_i$ and $p_j$ is relatively weak. In this case, the relation edge between $p_i$ and $p_j$ can be deleted.

In the above solution, the POI relation graph is updated by setting the threshold of retrieval times, which can effectively reduce noise interference and the scale of the POI relation graph, thereby improving the reliability and accuracy of the POI relation graph.

In an alternative embodiment, determining the regional aggregation representation of the target POI based on the POI relation graph including the target POI may include: based on a preset learning model, determining the regional aggregation representation of the target POI according to the POI relation graph. The preset learning model may be a model for learning graph data, such as a graph neural network model, etc. The embodiments of the present disclosure do not limit the specific type of the preset learning model. The preset learning model may be the same as or different from the learning model used in the determination of the spatial popularity representation, or, the preset learning model involved in the embodiment and the preset learning model used in the determination of the spatial popularity representation are different modules of a same model.

Exemplarily, determining the regional aggregation representation of the target POI based on the POI relation graph including the target POI may include: dividing a preset area around the target POI into a plurality of spatial sub-regions; determining a set of neighbor POIs of the target POI in each spatial sub-region; determining a regional aggregation representation of the target POI in each spatial sub-region based on an edge connection relation between each neighbor POI in the set and the target POI; and determining the regional aggregation representation of the target POI in the preset area around the target POI based on the regional aggregation representation of the target POI in each spatial sub-region.

It is understandable that the POI relation graph is introduced to determine the regional aggregation representation of the target POI, so that the determined POI spatial paradigmatic representation contains associated information of the neighbor POIs each having the edge connection relation with the target POI, and the regional aggregation representation carries regional spatial information of the target POI.

In an alternative embodiment of the present disclosure, after constructing POI relation graph of each POI, the method may further include: dividing the POI relation graph into a diffusion subgraph and an affinity subgraph based on a category of each POI in the POI relation graph; in which, the POIs connected by the relation edge in the diffusion subgraph are in different categories; and the POIs connected by the relation edge in the affinity subgraph are in the same category.

It is understandable that the category of POI is an important attribute of POI. The co-occurrence relation between POIs in different categories often represents a complementary association. For example, shopping mall and restaurant A, the two belong to different categories. When there is a co-occurrence relation between the shopping mall and restaurant A, it means that going to the shopping mall and going to the restaurant A for the user are dependently associated. The co-occurrence relation between POIs in the same category often indicates a potential competitive association. For example, restaurant A and restaurant B, belong to the same category. When there is a co-occurrence relation between restaurant A and restaurant B, it means that there is a competition between the two POIs restaurant A and restaurant B when the user goes to a restaurant. Therefore, in the embodiments of the present disclosure, the POI relation graph can be divided into a diffusion subgraph and an affinity subgraph according to the category of each POI in the POI relation graph. All the relation edges of the diffusion subgraph reflect associations between POIs in different categories, and all the relation edges of the affinity subgraph reflect associations between the POIs in the same category.

Dividing the POI relation graph into the diffusion subgraph and the affinity subgraph can further clarify the POIs with dependent association and POIs with competitive association, so as to refine the association between POIs, which can improve the accuracy of learning samples, thereby improving the learning effect of the POI representation of the learning model.

In S305, a relative position representation of each target POI is determined based on relative position data of the target POI.

The relative position data can represent a spatial dependence relation between the target POIs.

Exemplarily, the relative position data can be determined in the following method: obtaining a longitude vector and a latitude vector by respectively coding in a longitude direction and a latitude direction based on a relative position of the target POI and a neighbor POI within a preset spatial range of the target POI; and splicing and fusing the longitude vector and the latitude vector to obtain the relative position data.

In an alternative embodiment, determining the relative position representation of the target POI based on the relative position data of the target POI may include: determining an attention weight of each neighbor POI with respect to the target POI based on the relative position data; and obtaining the relative position representation by aggregating the regional aggregation representation and/or spatial popularity representation of each neighbor POI according to the attention weight.

It is understandable that by introducing relative position data, the aggregation of POI can be processed at the POI spatial relative position level, which solves the shortcoming of the learning ability to directly encode features such as latitude and longitude, and fully exploits the distance-dependent features and geographical distribution features of POIs, and improves the performance of POI relative position representation.

In S306, a POI spatial representation of each target POI is determined based on at least one of the spatial popularity representation, the regional aggregation representation and the relative position representation of the target POI.

Exemplarily, at least one of the spatial popularity representation, the regional aggregation representation and the relative position representation is spliced and fused in a preset order to obtain the POI spatial representation of the target POI, which is used to reflect the relevance of the target POIs at the POI level. The splicing order can be determined by technicians according to needs or empirical value.

In S307, POI representation data between the target POIs is determined based on the POI spatial representation and the POI service representation of each target POI.

Exemplarily, for each target POI, the POI spatial representation of the target POI and the POI service representation can be spliced and fused to obtain fused representation data; the fused representation data of each target POI can be spliced and fused again to obtain the POI representation data.

It is to be noted that when splicing and fusing to obtain the fused representation data for each target POI, the embodiments of the present disclosure do not limit the sequence of splicing and fusing, and further ensure that different target POIs adopts the same splicing sequence. In the process of determining the POI representation data, the splicing sequence of the fused representation data of each target POI is not limited in any way.

In S308, a competitive relation between the target POIs is determined based on the POI representation data.

The POI representation data can be processed to obtain a prediction probability of the competitive relation; when the prediction probability is greater than a preset probability threshold, it indicates that there is a competitive relation between the target POIs; when the prediction probability is not greater than the preset probability threshold, it indicates that there is no competitive relation between the target POIs. The preset probability threshold can be determined by technicians according to needs or empirical value, or determined through a large number of experiments.

The embodiment of the present disclosure introduces at least one of the spatial popularity representation determined based on the spatial distribution heat map, the regional aggregation representation determined based on the POI relation graph, and the relative position representation determined based on relative position data in the process of determining the POI representation data, and further determines the POI spatial representation, so as to introduce POI-level spatial location affinity data into the POI representation data, thus improving the richness and comprehensiveness of the content carried in the POI representation data, and laying the foundation of improving the accuracy of the determination result of the POI competitive relation.

Figure 7:
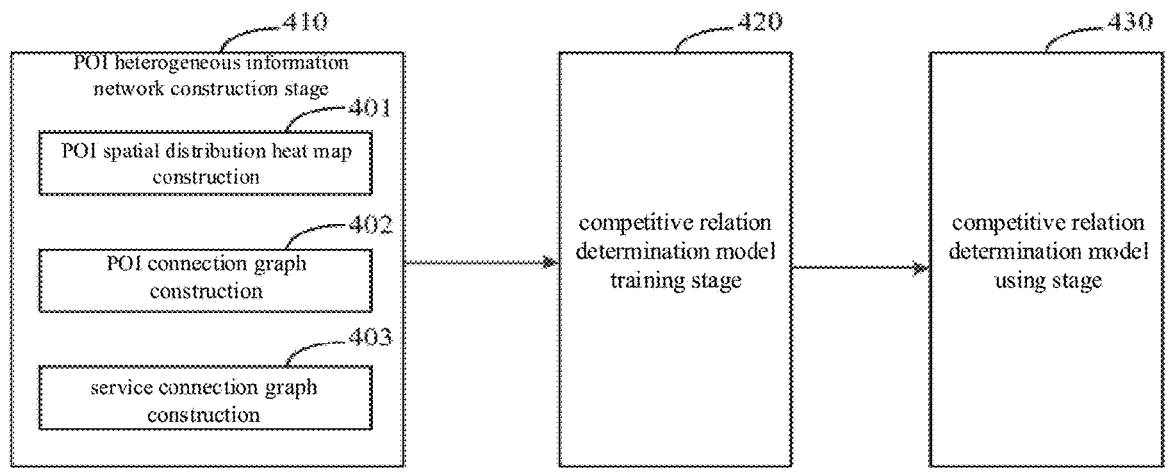
FIG. 7 is a schematic diagram illustrating a process for determining a competitive relation of POIs according to an example embodiment.

Referring to FIG. 7, the present disclosure further provides a preferred embodiment on the basis of the above technical solutions.

Figure 8:
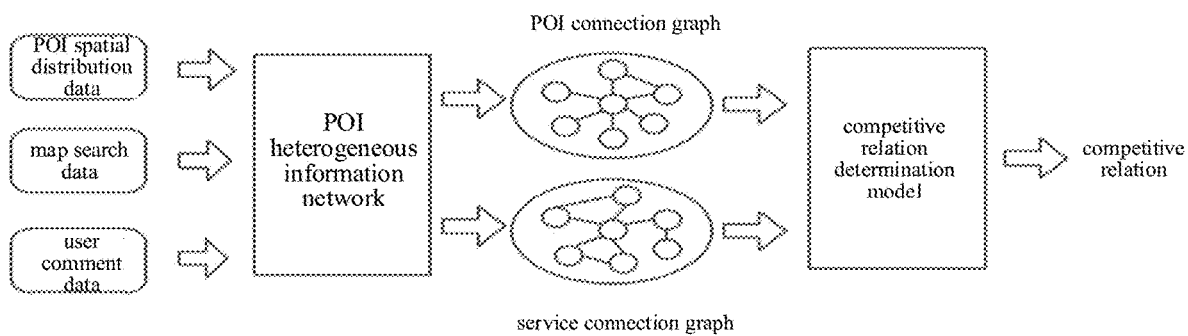
FIG. 8 is a schematic diagram illustrating a frame for predicting a POI competitive relation according to an example embodiment.

A schematic diagram illustrating a process for determining a competitive relation of POIs as illustrated in FIG. 7 includes: a POI heterogeneous information network construction stage 410, a competitive relation determination model training stage 420, and a competitive relation determination model using stage 430, which will be described combined with the schematic diagram illustrating a frame for predicting a POI competitive relation in FIG. 8 and the schematic diagram illustrating a POI heterogeneous information network in FIG. 9.

Exemplarily, the POI heterogeneous information network construction stage 410 includes a POI spatial distribution heat map construction 411, a POI connection graph construction 412, and a service connection graph construction 413.

Exemplarily, the POI spatial distribution heat map construction 411 includes: determining the POI spatial distribution heat map according to POI spatial distribution data.

Specifically, the spatial distribution heat map $M_i t, \in \mathbb{C}^{\times L \times L}$ around the POI $p_i$ is configured to represent the spatial distribution features around the area. $M_i$ is a tensor of which the size is $C \times L \times L$, representing that there are C heat map channels based on tag categories, and the heat map corresponding to a label channel is a two-dimensional matrix as illustrated in FIG. 9 (a), in which L identifies the number of grids in the spatial range. The tag category may be a category obtained by classifying POIs according to functional attributes or industry standards of the POIs.

The specific construction method may include: taking each POI as a center and dividing a surrounding area of the POI into grids according to a certain size (for example, 500 m×500 m), to obtain L×L grids in total. For each grid, a comprehensive popularity of the POI corresponding to a tag category c in a regional space $S_k$ of the surrounding area is counted as a matrix element value $v_k^c$ corresponding to the grid.

Exemplarily, the following formula can be used to determine the matrix element value:

$$v_k^c = \max_{\forall p_t \in S_k} \{f_{hot}(p_t) | tag(p_t) = c, 1 \leq c \leq C\}$$

where $f_{hot}(p_t)$ identifies a popularity value of the POI $p_t$; $|tag(p_t)=c$ restricts all POIs with the tag category c. In a specific implementation, max-pooling is used as an aggregation process in the regional space. Of course, other pooling functions can also be used as the aggregation process in the regional space, which is not limited in the embodiments of the present disclosure.

Exemplarily, the POI connection graph construction 412 includes: constructing a POI connection graph based on map search data of a user in a map application.

Alternatively, a co-occurrence relation between POIs is determined based on the map search data, in which the co-occurrence relation can be defined as follows: when two POIs are searched by the same user within a preset time period, it is determined that there is a co-occurrence relation the two POIs. It is to be noted that the present disclosure exemplarily provides the presentation of the co-occurrence relation based on co-search, of course, the co-occurrence relation can also be represented by co-visit or other user behavior activities, which are not limited in the embodiments of the present disclosure.

In a specific implementation, $(p_i, p_j, w_{ij})$ is used to indicate that two POIs $p_i$ and $p_j$ have been searched for $w_{ij}$ times by all users within a preset time period $\Delta t$. In order to reduce noise interference and reduce the size of the POI connection graph, a threshold $\theta_m$ can also be preset to screen the POI relation with a relatively weak association degree: when $w_{ij} < \theta_m$, the edge between $p_i$ and $p_j$ is deleted. According to the above process, the POI connection graph illustrated in FIG. 9 (b) can be constructed. $\theta_m$ can be set by technicians according to needs or empirical values.

Furthermore, tags are important attributes of POIs. The co-occurrence relation between POIs in different categories often indicates a complementary association. For example, there is a relation between a shopping mall and a restaurant (the two belong to different tag categories), indicating that there is a dependent association between going to shopping and going to the restaurant for the user. The co-occurrence relation between POIs in the same category indicates a potential competitive association. For example, the relation between fast food restaurant A and fast food restaurant B (which belong to the same tag) indicates that there is a competition between the two POIs when the user goes to a fast food restaurant. Therefore, based on the POI tag, the POI connection graph can be divided into two subgraphs: a POI diffusion graph and a POI affinity graph. All the relation edges of the POI diffusion graph reflect associations between POIs in different tag categories, and all the relation edges of the POI affinity graph reflect associations between POIs in the same tag category.

Exemplarily, the service connection graph construction 413 includes: constructing a service connection graph according to user comment data.

Alternatively, each POI corresponds to a brand. Because many POIs have a few comments (may be only few) which are difficult to accurately describe the POIs, further most of the contents of the text comments are for brand-specific functional services (including commodity service and experience service), so the POI user comment data belonging to the same brand may be aggregated to form a brand document that describes semantic features of the brand. The brand document is composed of a plurality of words, in which keywords that can reflect the functional services of the brand are service keywords. Therefore, it is necessary to dig out valuable service keywords from the document.

In a specific implementation, TF-IDF can be used to extract k words with the highest scores as the service keywords of the brand, that is, a brand-service edge relation between the brand and each service keyword is established, and the value of the TF-IDF is used as an edge attribute.

It is to be noted that the embodiments of the present disclosure only exemplify the screening of service keywords in the brand document by TF-IDF. Other important parameters in the related art can also be used to replace TF-IDF, which are not limited in the embodiments of the present disclosure.

In addition, there is also an association between service keywords. The higher the frequency of co-occurrence of service keywords in the comment data is, the stronger the service association of the service keywords is. For example, burgers and chips often appear together in comments.

In a specific implementation, PMI can be used to calculate a semantic similarity between service keywords extracted by each POI; a service edge relation between the service keywords is constructed according to the semantic similarity, and the semantic similarity is used as the edge attribute.

Specifically, for the two service keywords $a_1$ and $a_2$, the following formula is used to calculate the PMI:

$$PMI(a_1, a_2) = \log\left(\frac{p(a_1, a_2)}{p(a_1) \cdot p(a_2)}\right)$$

where p(a) represents the number of occurrences of the service keyword a in the brand document.

In order to reduce noise interference and reduce the scale of the service connection graph, the threshold $\theta_{PMI}$ can also be preset to screen the service relation edges with a relatively low association degree: when the $PMI(a_1,a_2) < \theta_{PMI}$, then the edge between the service keywords $a_1$ and $a_2$ is deleted. According to the above process, the service relation graph illustrated in FIG. 9 (d) can be constructed. $\theta_{PMI}$ can be set by technicians according to needs or empirical values.

In addition, there is an association between brands, but it is difficult to extract a brand relation from the brand document or POI comment data.

Figure 9:
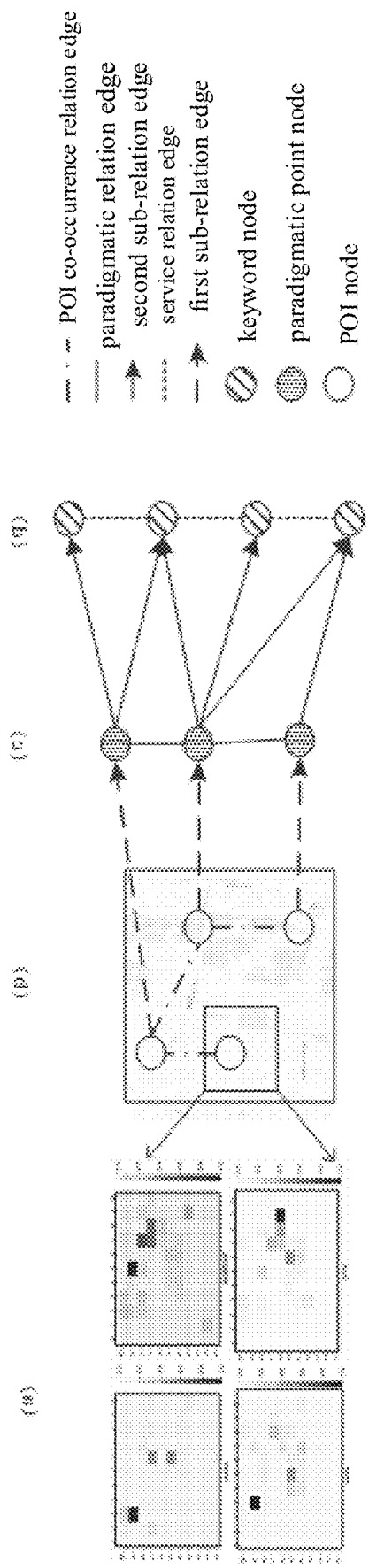
FIG. 9 is a schematic diagram illustrating a POI heterogeneous information network according to an example embodiment.

Exemplarily, a meta-path can be defined according to the POI connection graph and a relation between the POI and the brand, and the brand edge relation can be constructed according to the meta-path to obtain the brand relation graph illustrated in FIG. 9 (c).

Referring to (b) in FIG. 9, according to the definition of $b_i \xrightarrow{R_{pb}^{-1}} p_k \xrightarrow{R_{pp}} p_i \xrightarrow{R_{pb}} b_j b_i \xrightarrow{R_{pb}^{-1}} p_k \xrightarrow{R_{pp}} p_i \xrightarrow{R_{pb}} b_j$ where b represents a brand node; and p represents a POI node, $R_{pb}$ represents an ownership between the POI and the brand, and $R_{pp}$ represents a co-occurrence relation between the POIs.

In order to facilitate the description of the strength of the association between brands, the following formula can also be used to calculate the association degree between the brand $b_i$ and the brand $b_j$, and the association degree is used as the brand edge attribute:

$$s(b_i, b_j) = s(b_j, b_i) = \frac{|\{p_{b_i \to b_j} : p_{b_i \to b_j} \models \Phi\}|}{\sqrt{|\mathcal{N}_i^{(pb)}|} \cdot \sqrt{|\mathcal{N}_j^{(pb)}|}}$$

where $s(b_i, b_j)$ represents the association degree, and the symbol $\models$ represents that a path $p_{b_i} \sim b_j$ from $b_i$ to $b_j$ meets the defined meta-path $\Phi$, and $|\mathcal{N}_i^{(pb)}|$ represents the number of POIs of the brand node $b_i$, which is used to standardize the association degree.

The constructed brand relation graph, service relation graph, and the graph formed by the connection edges between the brands and the services are regarded as the service connection graph.

In summary, the POI spatial distribution heat map, POI connection graph, and service connection graph constructed in the POI heterogeneous information network construction stage 410 are collectively referred to as the POI heterogeneous information network.

Exemplarily, the competitive relation determination model training stage 420 includes: training network parameters in a deep learning network based on a competitive relation tag value between the POI heterogeneous information network and the POI.

Figure 10:
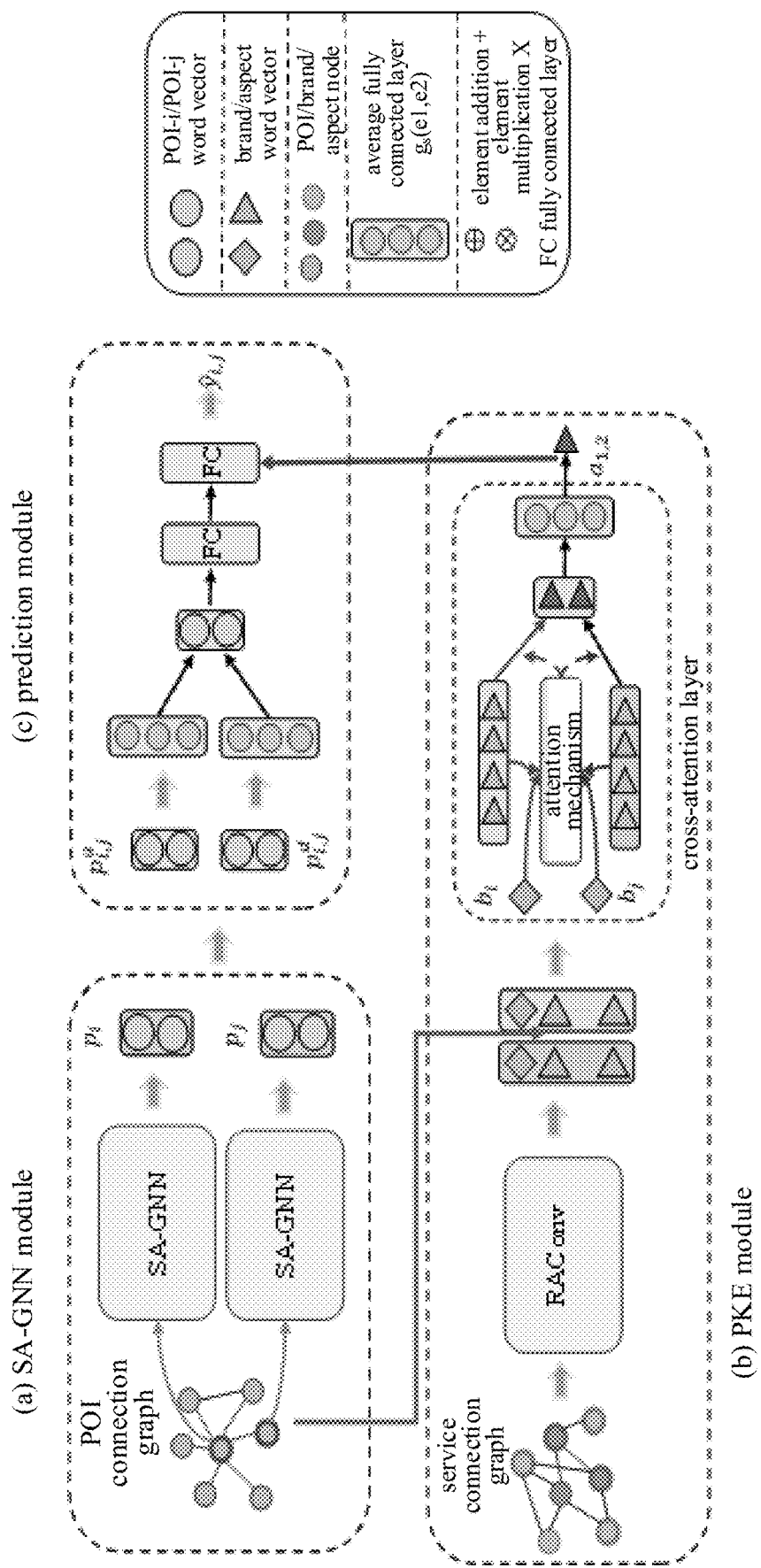
FIG. 10 is a schematic diagram illustrating a competitive relation predicting module according to an example embodiment.

A competitive relation prediction model implemented based on the deep learning model of a graph neural network illustrated in FIG. 10 includes a SA-GNN (Spatial adaptive graph neural network) module, a PKE (POI Knowledge Extraction) module and a prediction module.

Figure 11:
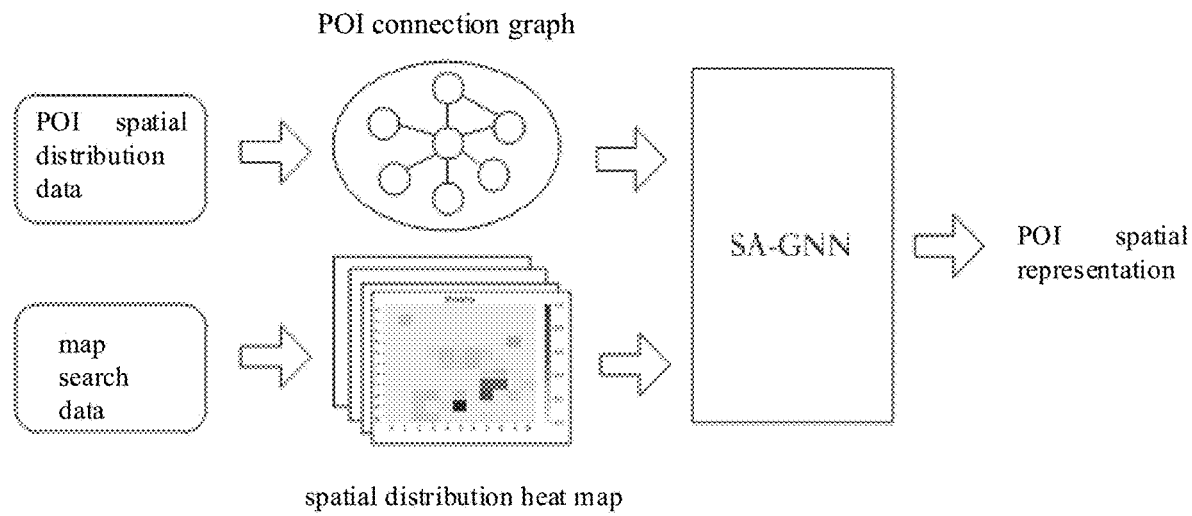
FIG. 11 is a flow chart illustrating a process of determining a POI spatial representation based on SA-GNN according to an example embodiment.

In an alternative embodiment, referring to the schematic diagram of the process of determining a POI spatial representation based on SA-GNN illustrated in FIG. 11, the POI spatial representation is learnt based on the POI connection graph (including the POI diffusion graph and the POI affinity graph) and the spatial distribution heat map. The POI spatial representation includes a POI space diffusion representation corresponding to the POI diffusion graph and a POI spatial affinity representation corresponding to the POI affinity graph.

Figure 12:
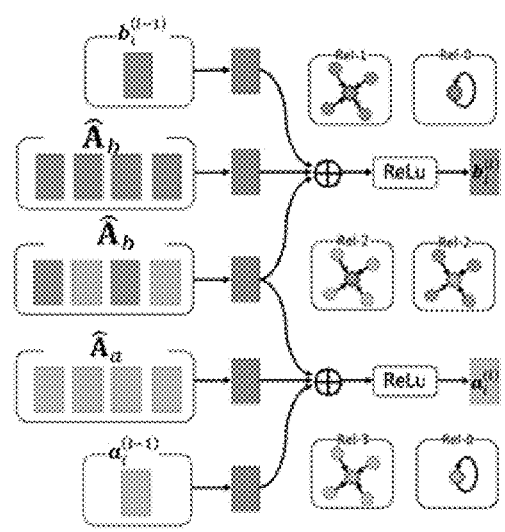
FIG. 12 is a schematic diagram illustrating a RA Cony model according to an example embodiment.

In an alternative embodiment, RA Cony (Relation-aware Aspect Convolution) illustrated in FIG. 12 is used to extract POI knowledge representations of the service relation graph. The RA Cony network can identify three different relations in the service relation graph: a brand relation (brand-brand), a brand service relation (brand-aspect) and a service relation (aspect-aspect). At least two RA Convs can be used for performing deep feature extraction in a cascade way. Using 1 to represent the number of cascaded layers of RA Cony, the following method can be used to determine the service representation and brand representation of the $1^{th}$ layer:

$$a_i^{(l)} = \sigma\left(Wa_i^{(l-1)} + \sum_{j \in \mathcal{N}_i^a} (\tilde{A}_a)_{ij} W_a a_j^{(l-1)} + \sum_{j \in \mathcal{N}_i^t} (\tilde{A}_t)_{ij} W_t b_j^{(l-1)}\right)$$

-continued $$b_i^{(l)} = \sigma\left(Wb_i^{(l-1)} + \sum_{j \in \mathcal{N}_i^b} (\tilde{A}_b)_{ij} W_b b_j^{(l-1)} + \sum_{j \in \mathcal{N}_i^t} (\tilde{A}_t)_{ij} W_t a_j^{(l-1)}\right)$$

where $a_i^{(l)}$ and $b_i^{(l)}$ respectively represent the service representation and brand representation of the $1^{th}$ layer, and $\hat{A}_a$ represents a Laplacian regularized adjacency matrix of the aspect-aspect relation:

$$\hat{A}_a = D_a^{-\frac{1}{2}}(A_a + I_N)D_a^{\frac{1}{2}};$$

in which $D_a$ is the number of neighbors of the service keyword node (aspect node), $A_a$ is a degree matrix of the aspect node, and $I_N$ is an identity matrix. In the same way, $\hat{A}_b$ and $\hat{A}_t$ represent Laplacian regularized adjacency matrices of the brand-brand relation and the aspect-brand relation respectively, which can be calculated similar to $\hat{A}_a$. $\mathcal{N}_i^a$ represents a set of aspect neighbor nodes having edge connection with the aspect node, $\mathcal{N}_i^b$ represents a set of brand neighbor nodes having edge connection with the brand node, and $\mathcal{N}_i^t$ represents a set of brand neighbor nodes having edge connection with the aspect node or a set of aspect neighbor nodes having edge connection with the brand node. $W$, $W_a$, $W_b$ and $W_t$ are network parameters to be learned.

$\sigma()$ is a ReLU activation function. Of course, other activation functions can also be used, which is not limited in the embodiments of the present disclosure.

It is to be noted that the input data of the $1^{th}$ layer is a word vector obtained by encoding a service keyword corresponding to the aspect node or a brand corresponding to the brand node. The encoding can be implemented by the method of word2Vect and the like, which is not limited in the embodiments of the present disclosure.

After RA Cony learning, the service representation and brand representation of each POI node are obtained. A pair of POIs corresponds to a pair of brand representation $b_i$ and $b_j$, and the two brands correspond to two lists of service representations $\{a_1^i, \ldots, a_m^i\}$ and $\{a_1^j, \ldots, a_n^j\}$. Due to difference in the influences of $b_i$ on the service representations in $b_j$, it is also possible to introduce an attention mechanism when determining the POI knowledge representation to determine an attention weight of one brand $b_i$ to each service representation in another brand $b_j$.

Exemplarily, the following formula can be used to calculate a cosine similarity:

$$\pi(b_i, a_l^j) = \frac{b_i \cdot a_l^j}{\|b_i\| \cdot \|a_l^j\|}, l \in [1, n]$$

and an attention weight of $b_j$ to a service representation: $a_k^i$ in $b_i$ can be determined according to the cosine similarity:

$$\beta_k = \frac{\exp(\pi(b_j, a_k^i))}{\sum_{l=1}^m \exp(\pi(b_j, a_l^i))}$$

finally, the following formula is used to determine the POI knowledge representation $a_i$ of the POI node belonging to the brand $b_i$:

$$a_i = \sum_{k=1}^{m} \beta_k a_k^i$$

The determination method of the POI knowledge representation $a_j$ of the POI node belonging to the brand $b_j$ is similar to that of $a_i$, and will not be elaborated here.

Further, a fully connected layer is used to fuse the POI knowledge representations $a_i$ and $a_j$ of the two POIs to obtain a POI knowledge representation pair.

When directly splicing the POI knowledge representations $a_i$ and $a_j$, there may be a problem of asymmetry in the POI knowledge representation pair due to different splicing sequences, which affects the accuracy of the model. Therefore, when using the fully connected layer to fuse the POI knowledge representations $a_i$ and $a_j$, an average fully connected layer $g_s(e_1, e_2)$ can be used to eliminate the asymmetry:

$$g_s(e_1, e_2) = \frac{W_g(e_1 \oplus e_2) + W_g(e_2 \oplus e_1)}{2}$$

where $W_g$ is a network parameter to be learned.

Specifically, the POI knowledge representations $a_i$ and $a_j$ are input into the average fully connected layer to obtain the POI knowledge representation pair $a_{i,j}$:

$$a_{i,j} = g_s(a_i, a_j)$$

Since, for each POI, the SA-GNN module of the competitive relation determination model is used to obtain a POI spatial diffusion representation $p_i^d$ and a POI spatial affinity representation $p_i^a$, the aforementioned average fully connected layer is also used to obtain a POI spatial representation pair:

$$p_{i,j} = W_t \cdot (g_s(p_i^a, p_j^a) \oplus g_s(p_i^d, p_j^d))$$

where $W_t$ is a network parameter to be learned.

On the basis of the above technical solution, according to the POI knowledge representation pair $a_{i,j}$ and the POI spatial representation pair $p_{i,j}$, the competitive relation between the two POIs is predicted, and the predicted probability is obtained:

$$\hat{y}_{i,j} = \text{sigmoid}(W_o \cdot (p_{i,j} \oplus a_{i,j}))$$

where $\hat{y}_{i,j}$ is a prediction outcome, sigmoid( ) is an activation function, and $W_o$ is a network parameter to be learned.

A target loss function is introduced to adjust the network parameters in the competitive relation prediction network. In a specific embodiment, the target loss function may adopt the following cross-entropy loss function:

$$\mathcal{L} = \sum_{(p_i, p_j) \in \mathcal{D}} (y_{i,j} \log \hat{y}_{i,j} + (1 - y_{i,j}) \log(1 - \hat{y}_{i,j}))$$

where $\mathcal{D}$ represents POI competitive relation training sample data, and $y_{i,j}$ is a competitive relation tag value. Specifically, when there is a competitive relation, the tag value can be 1; when there is no competitive relation, the tag value can be 0.

Exemplarily, the competitive relation determination model using phase 430 includes: obtaining POI identifications in the spatial distribution heat map, the POI connection graph, and the service connection graph of the two target POIs; and adopting the trained competitive relation prediction model to predict the competitive relation between the target POIs. The POI connection graph and the service connection graph belong to sub-graphs of the POI connection graph and the service connection graph used in the training process, that is, both of the POI connection graph and the service connection graph used in the training process contain the two target POIs.

The embodiments of the present disclosure combine semantic information (service representation) of the brand's comment data to which the POIs belong and the spatial features of the POIs to predict the competitive relation of the POIs. Compared with the method of using traditional manual experience to predict the competitive relation, the labor cost is lower, further the inventive method does not rely on domain knowledge and meanwhile the determination efficiency is high, which can effectively quantify the competitive relation and facilitate long-term analysis and application. In addition, the automatic determination of the competitive relation based on the deep learning model has a strong generalization ability, which can effectively avoid the influence of noisy data, and comprehensively analyze the competitive relation from multiple angles such as the spatial distribution and the functional services of the brands to which the POIs belong, and improve the accuracy of the determination result of the competitive relation.

Figure 13:
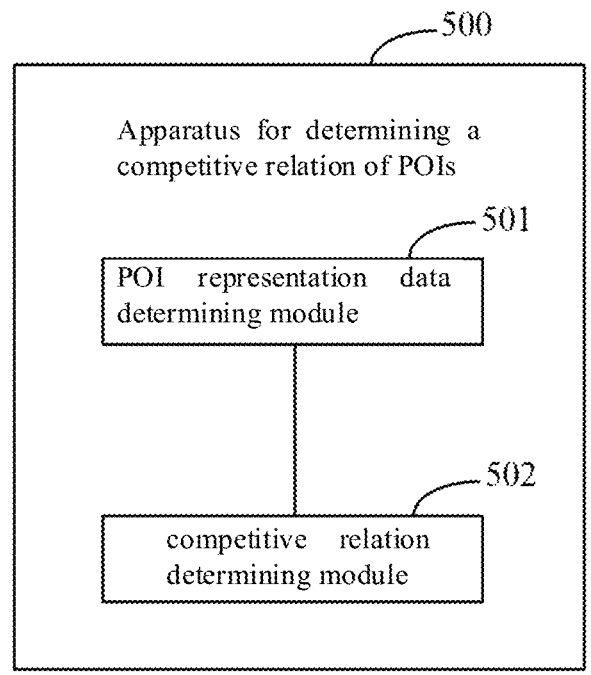
FIG. 13 is a block diagram illustrating an apparatus for determining a competitive relation of POIs according to an example embodiment.

As an implementation of the method for determining a competitive relation of POIs illustrated in the above embodiments, the embodiments of the present disclosure also provide an apparatus for determining a competitive relation of POIs. Referring to FIG. 13, the apparatus 500 for determining a competitive relation of POIs includes: a POI representation data determining module 501 and a competitive relation determining module 502.

The POI representation data determining module 501 is configured to determine POI representation data between two target POIs based on service-related data of the target POIs; and the competitive relation determining module 502 is configured to determine a competitive relation of the target POIs based on the POI representation data.

In the embodiments of the present disclosure, in the process of determining the competitive relation between the target POIs, the POI representation data between the target POIs is introduced, thus an implicit representation of association of the target POIs on the service level is carried in the POI representation data. Since the implicit representation of association on the service level can reflect the competitive relation between the target POIs, for example, the provided services are the same or similar, the competitive relation between the target POIs can be determined based on the implicit representation of association on the service level, which improves the accuracy of the determination result of the competitive relation. In addition, the determination method by using the POI representation data takes the place of the determination method based on traditional experience or statistics, such that there is no need to invest a lot of time and labor, and the time efficiency of determining a competitive relation between the target POIs is improved.

Further, the POI representation data determining module 501 includes a service-related data determining unit and a POI representation data determining unit.

The service-related data determining unit is configured to determine the service-related data based on a similarity relation of comment data of the target POIs; and the POI representation data determining unit is configured to determine the POI representation data between the target POIs based on the service-related data of each target POI.

Further, the service-related data determining unit includes a service-related data determining sub-unit.

The service-related data determining sub-unit is configured to determine the service-related data of the target POIs based on a pre-constructed POI heterogeneous information network; in which the POI heterogeneous information network is constructed by the following: extracting service keywords of comment data of a plurality of candidate POIs; and constructing the POI heterogeneous information network based on a co-occurrence relation of respective candidate POIs and a similarity relation of the service keywords.

Further, the apparatus further includes a POI heterogeneous information network constructing module, which specifically includes a service keyword extracting unit and a POI heterogeneous information network constructing unit.

The service keyword extracting unit is configured to extract service keywords of comment data of a plurality of candidate POIs; and the POI heterogeneous information network constructing unit is configured to construct the POI heterogeneous information network based on a co-occurrence relation of respective candidate POIs and a similarity relation of the service keywords. The service keyword extracting unit includes a paradigmatic comment data obtaining sub-unit and a service keyword extracting sub-unit.

The paradigmatic comment data obtaining sub-unit is configured to obtain paradigmatic comment data associated with paradigmatic points of the candidate POIs; and the service keyword extracting sub-unit is configured to extract the service keywords from the paradigmatic comment data.

Further, the POI heterogeneous information network constructing unit includes a service relation edge constructing unit, a first relation edge constructing sub-unit and a service edge attribute determining sub-unit.

The service relation edge constructing unit is configured to construct a service relation edge between keyword nodes of the service keywords based on the similarity relation of the service keywords; the first relation edge constructing sub-unit is configured to construct a first relation edge between a POI node of the candidate POI and the keyword node of the service keyword based on a consistency of paradigmatic points to which the candidate POI and the service keyword belong; and the service edge attribute determining sub-unit is configured to determine a service edge attribute of each service relation edge based on a similarity between service keywords associated with the service relation edge.

The service-related data determining sub-unit includes a target keyword node determining slave unit and a service type data determining slave unit.

The target keyword node determining slave unit is configured to determine target keyword nodes associated with the target POIs based on the first relation edge and the service relation edge in the POI heterogeneous information network; and the service type data determining slave unit is configured to determine service-related data of a service type of the target POIs based on the service edge attribute between the target keyword nodes.

Further, the first relation edge constructing sub-unit includes a first sub-relation edge constructing slave unit and a second sub-relation edge constructing slave unit.

The first sub-relation edge constructing slave unit is configured to construct a first sub-relation edge between the POI node and a paradigmatic point node of the paradigmatic point based on an ownership of the candidate POI and the paradigmatic point; and the second sub-relation edge constructing slave unit is configured to construct a second sub-relation edge between a paradigmatic point node of the paradigmatic point and the keyword node based on an ownership of the paradigmatic point and service keyword.

Further, the POI heterogeneous information network constructing unit further includes a paradigmatic relation edge constructing sub-unit, a paradigmatic edge attribute constructing sub-unit and a second edge attribute determining sub-unit.

The paradigmatic relation edge constructing sub-unit is configured to construct a paradigmatic relation edge between paradigmatic point nodes of paradigmatic points to which the candidate POIs belong based on the co-occurrence relation between the candidate POIs; the paradigmatic edge attribute constructing sub-unit is configured to determine a paradigmatic edge attribute of each paradigmatic relation edge based on connected data between the paradigmatic point nodes connected by the paradigmatic relation edge; and the second edge attribute determining sub-unit is configured to determine a second edge attribute of each second sub-relation edge based on a contribution degree of the service keyword associated with the second sub-relation edge to paradigmatic comment data of the paradigmatic point associated with the second sub-relation edge.

The service-related data determining sub-unit further includes a node determining slave unit, a paradigmatic type data determining slave unit and a dissimilar node type data determining slave unit.

The node determining slave unit is configured to respectively determine target paradigmatic point nodes and target keyword nodes associated with the target POIs based on the first sub-relation edge and the second sub-relation edge; the paradigmatic type data determining slave unit is configured to determine service-related data of a paradigmatic type of the target POIs based on the paradigmatic edge attribute between the target paradigmatic point nodes; and the dissimilar node type data determining slave unit is configured to determine service-related data of a dissimilar node type of the target POIs based on the second edge attribute between the paradigmatic point nodes and the target keyword node.

Further, the service edge attribute determining sub-unit includes a semantic similarity determining slave unit and a service edge attribute determining slave unit.

The semantic similarity determining slave unit is configured to determine a semantic similarity between the service keywords associated with the service relation edge; and the service edge attribute determining slave unit is configured to configure the semantic similarity as the service edge attribute.

Further, the paradigmatic edge attribute constructing sub-unit includes a meta-path number determining slave unit and a paradigmatic edge attribute determining slave unit.

The meta-path number determining slave unit is configured to determine a number of meta-paths between the paradigmatic point nodes connected by the paradigmatic relation edge; and the paradigmatic edge attribute determining slave unit is configured to determine the paradigmatic edge attribute based on the number of the meta-paths; in which the meta-path is a path connected by the paradigmatic point nodes via the POI node of the candidate POI and/or a POI relation edge between the POI nodes; and in which the POI relation edge is constructed based on the co-occurrence relation between the candidate POIs.

Further, the paradigmatic edge attribute determining slave unit includes a POI number determining A-slave unit and a paradigmatic edge attribute determining A-slave unit.

The POI number determining A-slave unit is configured to determine a number of candidate POI nodes each having the first sub-relation edge with the paradigmatic point node connected by the paradigmatic relation edge; and the paradigmatic edge attribute determining A-slave unit is configured to determine the paradigmatic edge attribute based on the number of the meta-paths and the number of the candidate POI nodes.

Further, the service keyword extracting unit includes a contribution degree determining sub-unit and a service keyword screening sub-unit.

The contribution degree determining sub-unit is configured to segment the paradigmatic comment data and determine a contribution degree of each word segmentation in a segmentation result; and the service keyword screening sub-unit is configured to screen the service keywords in the segmentation result according to a ranking result of the contribution degrees.

Further, the POI heterogeneous information network constructing unit further includes a service relation edge filtering sub-unit.

The service relation edge filtering sub-unit is configured to filter out the service relation edge corresponding to the similarity not meeting a similarity threshold.

Further, the POI representation data determining unit includes a POI service representation determining A-sub unit and a POI representation data determining sub-unit.

The POI service representation determining A-sub unit is configured to determine a POI service representation of each target POI based on the service-related data; and the POI representation data determining sub-unit is configured to determine the POI representation data between the target POIs based on the POI service representation of each target POI.

Further, the POI representation data determining unit includes a POI service representation determining B-sub unit and a POI representation data determining sub-unit.

The POI service representation determining B-sub unit is configured to determine a POI service representation of each target POI based on the service-related data of the service type; and the POI representation data determining sub-unit is configured to determine the POI representation data between the target POIs based on the POI service representation of each target POI.

Further, the POI representation data determining unit includes a POI service representation determining C-sub unit, a POI paradigmatic representation determining C-sub unit, a POI service representation updating C-sub unit and a POI representation data determining sub-unit.

The POI service representation determining C-sub unit is configured to determine a POI service representation of each target POI based on the service-related data of the service type and the service-related data of the dissimilar node type; the POI paradigmatic representation determining C-sub unit is configured to determine a POI paradigmatic representation of each target POI based on the service-related data of the paradigmatic type and the service-related data of the dissimilar node type; the POI service representation updating C-sub unit is configured to use the POI paradigmatic representation of one target POI to update the POI service representation of the other target POI; and the POI representation data determining sub-unit is configured to determine the POI representation data between the target POIs based on the POI service representation of each target POI.

Further, the POI service representation determining C-sub unit includes a service adjacency matrix determining C-slave unit and a POI service representation obtaining C-slave unit.

The service adjacency matrix determining C-slave unit is configured to respectively determine a service adjacency matrix and a first dissimilar node adjacency matrix based on the service-related data of the service type and the service-related data of the dissimilar node type; and the POI service representation obtaining C-slave unit is configured to process the service adjacency matrix and the first dissimilar node adjacency matrix to obtain the POI service representation.

The POI paradigmatic representation determining C-sub unit includes a paradigmatic adjacency matrix determining C-slave unit and a POI paradigmatic representation obtaining C-slave unit.

The paradigmatic adjacency matrix determining C-slave unit is configured to respectively determine a paradigmatic adjacency matrix and a second dissimilar node adjacency matrix based on the service-related data of the paradigmatic type and the service-related data of the dissimilar node type; and the POI paradigmatic representation obtaining C-slave unit is configured to process the paradigmatic adjacency matrix and the second dissimilar node adjacency matrix to obtain the POI paradigmatic representation.

Further, the POI service representation updating C-sub unit includes a POI service representation updating C-sub unit.

The POI service representation updating C-slave unit is configured to determine an attention weight based on the POI paradigmatic representation and weight the POI service representation according to the attention weight to update the POI service representation.

Further, the POI representation data determining sub-unit includes a first fusion data obtaining slave unit, a second fusion data obtaining slave unit and a POI representation data determining slave unit.

The fusion data obtaining slave unit is configured to fuse the POI service representations of the target POIs according to a first order to obtain first fusion data; the second fusion data obtaining slave unit is configured to fuse the POI service representations of the target POIs according to a second order to obtain second fusion data; wherein the second order is opposite to the first order; and the POI representation data determining slave unit is configured to determine the POI representation data based on the first fusion data and the second fusion data.

Further, the POI representation data determining sub-unit includes a spatial popularity representation determining slave unit, a regional aggregation representation determining slave unit, a relative position representation determining slave unit, a POI spatial representation determining slave unit and a POI representation data determining slave unit.

The spatial popularity representation determining slave unit is configured to determine a spatial popularity representation of each target POI based on a spatial distribution heat map of the target POI; the regional aggregation representation determining slave unit is configured to determine a regional aggregation representation of each target POI based on a POI relation graph including the target POI; wherein the POI relation graph is constructed based on the co-occurrence relation of the plurality of candidate POIs; the relative position representation determining slave unit is configured to determine a relative position representation of each target POI based on relative position data of the target POI; the POI spatial representation determining slave unit is configured to determine a POI spatial representation of each target POI based on at least one of the spatial popularity representation, the regional aggregation representation and the relative position representation of the target POI; and the POI representation data determining slave unit is configured to determine the POI representation data between the target POIs based on the POI spatial representation and the POI service representation of each target POI.

The above apparatus for determining a competitive relation of POIs can execute the method for determining a competitive relation of POIs provided by any embodiment of the present disclosure, and has the corresponding functional modules and beneficial effects of the method for determining a competitive relation of POIs.

According to the embodiments of the present disclosure, the present disclosure also provides an electronic device and a readable-storage medium.

Figure 14:
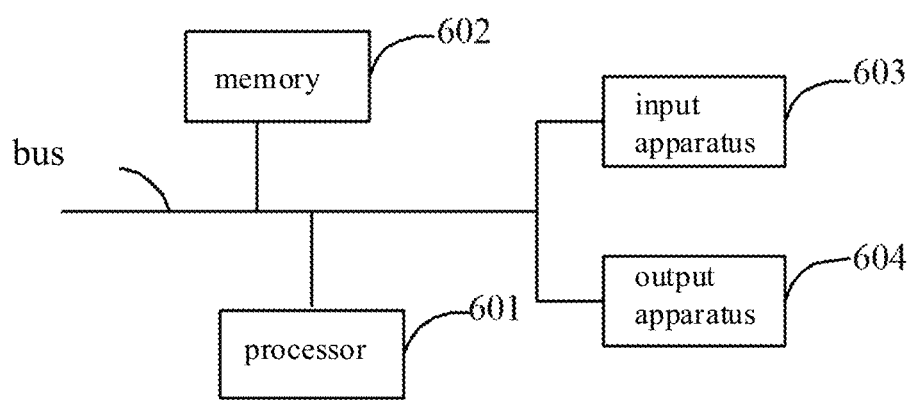
FIG. 14 is a block diagram illustrating an electronic device for realizing the method for determining a competitive relation of POIs according to an example embodiment.

FIG. 14 is a block diagram illustrating an electronic device for realizing the method for determining a competitive relation of POIs according to an example embodiment. Electronic devices are intended to represent various forms of digital computers, such as laptop computers, desktop computers, work tables, personal digital assistants, servers, blade servers, mainframe computers, and other suitable computers. Electronic devices can also represent various forms of mobile apparatus, such as personal digital processors, cellular phones, smart phones, wearable devices, and other similar computing apparatus. The components illustrated herein, their connections and relationships, and their functions are merely examples, and are not intended to limit the implementation of the disclosure described and/or required herein.

As illustrated in FIG. 14, the electronic device includes one or more processors 601, a memory 602, and interfaces for connecting various components, including high-speed interfaces and low-speed interfaces. The various components are connected to each other by different buses, and can be installed on a common motherboard or installed in other ways as needed. The processor may process instructions executed in the electronic device, including instructions stored in or on the memory to display graphical information of the GUI on an external input/output apparatus (such as a display device coupled to an interface). In other embodiments, when necessary, a plurality of processors and/or a plurality of buses can be used with a plurality of memories and a plurality of memories. Similarly, a plurality of electronic devices can be connected, and each device provides some necessary operations (for example, as a server array, a group of blade servers, or a multi-processor system). In FIG. 14, a processor 601 is taken as an example.

The memory 602 is a non-transitory computer-readable storage medium provided by the disclosure. The memory stores instructions that can be executed by at least one processor, so that at least one processor executes the method for determining a competitive relation of POIs provided by the present disclosure. The non-transitory computer-readable storage medium of the present disclosure has computer instructions stored thereon, in which the computer instructions are used to make a computer execute the method for determining a competitive relation of POIs provided by the present disclosure.

As a non-transitory computer-readable storage medium, the memory 602 can be used to store non-transitory software programs, non-transitory computer-executable programs and modules, such as program instructions/modules corresponding to the method for determining a competitive relation of POIs in the embodiments of the present disclosure (for example, the POI representation data determining module 501 and the competitive relation determining module 502 illustrated in FIG. 13). The processor 601 implements various functional applications and data processing of the server, that is, implements the method for determining a competitive relation of POIs in the above method embodiments, by running non-transitory software programs, instructions, and modules stored in the memory 602.

The memory 602 may include a storage program area and a storage data area, in which the storage program area may store an operating system and at least an application program required by one function; the storage data area may store data created by the use of an electronic device that implements the method for determining a competitive relation of POIs. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include a memory remotely provided compared with the processor 601, and these remote memories may be connected to an electronic device that implements the method for determining a competitive relation of POIs through network. Examples of the above networks include, but are not limited to, Internet, corporate Intranet, local area network, mobile communication network, and combinations thereof.

The electronic device implementing the method for determining a competitive relation of POIs may further include: an input apparatus 603 and an output apparatus 604. The processor 601, the memory 602, the input apparatus 603, and the output apparatus 604 may be connected by a bus or other methods. In FIG. 14, the connection by a bus is taken as an example.

The input apparatus 603 can receive input digital or character information, and generate key signal input related to the user settings and function control of the electronic device that implements the method for determining a competitive relation of POIs, such as touch screens, keypads, mouses, trackpads, touchpads, and instructing arms, one or more mouse buttons, trackballs, joysticks and other input apparatus. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein can be implemented in digital electronic circuit systems, integrated circuit systems, specific application-specific integrated circuit (ASIC), computer hardware, firmware, software, and/or combinations thereof. These various embodiments may be implemented in one or more computer programs, in which the one or more computer programs may be executed and/or interpreted on a programmable system including at least one programmable processor, in which the programmable processor may be a dedicated or general purpose programmable processor that can receive data and instructions from the storage system, at least one input apparatus, and at least one output apparatus, and transmit the data and instructions to the storage system, at least one input apparatus, and at least one output apparatus.

These computational procedures (also called programs, software, software applications, or codes) include machine instructions of a programmable processor, and can be implemented using high-level procedures and/or object-oriented programming languages, and/or assembly/machine language to implement computational procedures. As used herein, the terms "machine-readable medium" and "computer-readable medium" refer to any computer program product, device, and/or apparatus used to provide machine instructions and/or data to a programmable processor (for example, magnetic disks, optical disks, memories, programmable logic devices (PLD)), including machine-readable media that receive machine instructions as machine-readable signals. The term "machine-readable signal" refers to any signal used to provide machine instructions and/or data to a programmable processor.

In order to provide interaction with the user, the systems and technologies described herein can be implemented on a computer and the computer includes a display apparatus for displaying information to the user (for example, a CRT (cathode ray tube) or an LCD (liquid crystal display) monitor)); and a keyboard and a pointing apparatus (for example, a mouse or a trackball) through which the user can provide input to the computer. Other types of apparatus can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser through which the user can interact with the implementation of the systems and technologies described herein), or a computing system that includes any combination of the back-end components, middleware components, or front-end components. The components of the system can be connected to each other through any form or medium of digital data communication (for example, a communication network). Examples of communication networks include: local area networks (LAN), wide area networks (WAN), the Internet, and blockchain networks.

The computer system may include a client and a server. The client and server are generally far away from each other and usually interact through a communication network. The relationship between the client and the server is generated by computer programs that run on the corresponding computer and have a client-server relationship with each other. The server can be a cloud server, also known as a cloud computing server or a cloud host, which is a host product in the cloud computing service system to solve the problem of difficult management and weak business scalability of traditional physical hosts and VPS services.

According to the technical solution of the embodiments of the present disclosure, in the process of determining the competitive relation between the target POIs, the POI representation data between the target POIs is introduced, thus an implicit representation of association of the target POIs on the service level is carried in the POI representation data. Since the implicit representation of association on the service level can reflect the competitive relation between the target POIs, for example, the provided services are the same or similar, the competitive relation between the target POIs is determined based on the implicit representation of association on the service level, which improves the accuracy of the determination result of the competitive relation. In addition, the determination method by using the POI representation data takes the place of the determination method based on the traditional experience or statistics, such that there is no need to invest a lot of time and labor, and the time efficiency of determining the competitive relation between the target POIs is improved.

It is to be understood that the various forms of processes illustrated above can be used to reorder, add or delete blocks. For example, the blocks described in the present disclosure can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of this disclosure.

It is to be noted that the embodiments of the present disclosure relate to artificial intelligence technology, which is the discipline that studies the use of computers to simulate certain human thinking processes and intelligent learning (such as learning, reasoning, thinking, planning, etc.) with both hardware-level technologies and software-level technologies. Artificial intelligence hardware technologies generally include technologies such as sensors, dedicated artificial intelligence chips, cloud computing, distributed storage, and big data processing; artificial intelligence software technologies mainly include technologies in several directions, such as computer vision technology, speech recognition technology, natural semantic processing technology and machine learning/deep learning, big data processing technology, and knowledge graph technology.

What is claimed is:

1. A method for determining a competitive relation of Points of Interest (POI), comprising:
    determining service-related data of target POIs based on a pre-constructed POI heterogeneous information network, wherein the POI heterogeneous information network is constructed by: extracting service keywords of comment data of a plurality of candidate POIs; and constructing the POI heterogeneous information network based on co-occurrence relations of respective candidate POIs and similarity relations of the service keywords;
    determining POI representation data between the target POIs based on the service-related data of the target POIs; and
    determining a competitive relation between the target POIs based on the POI representation data,
    wherein constructing the POI heterogeneous information network based on the co-occurrence relations of respective candidate POIs and the similarity relations of the service keywords comprises:
    constructing a service relation edge between keyword nodes of the service keywords based on the similarity relation of the service keywords;
    constructing a first relation edge between a POI node of the candidate POI and the keyword node of the service keyword based on a consistency of paradigmatic points to which the candidate POI and the service keyword belong; and determining a service edge attribute of each service relation edge based on a similarity between the service keywords associated with the service relation edge, wherein the similarity between the service keywords indicates a semantic similarity between the service keywords;

wherein determining the service-related data of the target POIs based on the pre-constructed POI heterogeneous information network comprises:

determining target keyword nodes associated with the target POIs based on the first relation edge and the service relation edge in the POI heterogeneous information network; and determining service-related data of a service type of the target POIs based on the service edge attribute of the service relation edge between the target keyword nodes, wherein determining the POI representation data between the target POIs based on the service-related data of the target POIs comprises:

determining a POI service representation of each target POI based on the service-related data of the service type, by adopting a feature extraction network to extract the POI service representation in the service-related data of each target POI; and determining the POI representation data between the target POIs based on the POI service representation of each target POI, by introducing an average fully connected layer to process the POI service representation of each target POI.

2. The method of claim 1, wherein constructing the first relation edge between the POI node of the candidate POI and the keyword node of the service keyword based on the consistency of the paradigmatic points to which the candidate POI and the service keyword belong comprises:

constructing a first sub-relation edge between the POI node and a paradigmatic point node of the paradigmatic point based on an ownership of the candidate POI and the paradigmatic point; and constructing a second sub-relation edge between a paradigmatic point node of the paradigmatic point and the keyword node based on an ownership of the paradigmatic point and service keyword.

3. The method of claim 2, further comprising:

constructing a paradigmatic relation edge between paradigmatic point nodes of paradigmatic points to which the candidate POIs belong based on the co-occurrence relation between the candidate POIs;

determining a paradigmatic edge attribute of each paradigmatic relation edge based on connected data between the paradigmatic point nodes connected by the paradigmatic relation edge; and determining a second edge attribute of each second sub-relation edge based on a contribution degree of the service keyword associated with the second sub-relation edge to paradigmatic comment data of the paradigmatic point associated with the second sub-relation edge;

wherein determining the service-related data of the target POIs based on the pre-constructed POI heterogeneous information network further comprises:

respectively determining target paradigmatic point nodes and target keyword nodes associated with the target POIs based on the first sub-relation edge and the second sub-relation edge;

determining service-related data of a paradigmatic type of the target POIs based on the paradigmatic edge attribute between the target paradigmatic point nodes; and determining service-related data of a dissimilar node type of the target POIs based on the second edge attribute between the paradigmatic point node and the target keyword node.

4. The method of claim 3, wherein determining the POI representation data between the target POIs based on the service-related data of each target POI comprises:

determining a POI service representation of each target POI based on the service-related data of the service type and the service-related data of the dissimilar node type;

determining a POI paradigmatic representation of each target POI based on the service-related data of the paradigmatic type and the service-related data of the dissimilar node type;

using the POI paradigmatic representation of one target POI to update the POI service representation of the other target POI; and determining the POI representation data between the target POIs based on the POI service representation of each target POI.

5. An electrical device, comprising:

at least one processor, and a memory communicatively coupled to the at least one processor; wherein, the memory is configured to store instructions executable by at least one processor; when the instructions are executed by the at least one processor, the at least one processor is caused to execute the method for determining a competitive relation of POIs, comprising:

determining service-related data of target POIs based on a pre-constructed POI heterogeneous information network, wherein the POI heterogeneous information network is constructed by: extracting service keywords of comment data of a plurality of candidate POIs; and constructing the POI heterogeneous information network based on co-occurrence relations of respective candidate POIs and similarity relations of the service keywords;

determining POI representation data between the target POIs based on the service-related data of the target POIs; and determining a competitive relation between the target POIs based on the POI representation data, wherein constructing the POI heterogeneous information network based on the co-occurrence relations of respective candidate POIs and the similarity relations of the service keywords comprises:

constructing a service relation edge between keyword nodes of the service keywords based on the similarity relation of the service keywords;

constructing a first relation edge between a POI node of the candidate POI and the keyword node of the service keyword based on a consistency of paradigmatic points to which the candidate POI and the service keyword belong; and determining a service edge attribute of each service relation edge based on a similarity between the service keywords associated with the service relation edge, wherein the similarity between the service keywords indicates a semantic similarity between the service keywords;

wherein determining the service-related data of the target POIs based on the pre-constructed POI heterogeneous information network comprises:

determining target keyword nodes associated with the target POIs based on the first relation edge and the service relation edge in the POI heterogeneous information network; and determining service-related data of a service type of the target POIs based on the service edge attribute of the service relation edge between the target keyword nodes, wherein determining the POI representation data between the target POIs based on the service-related data of the target POIs comprises:

determining a POI service representation of each target POI based on the service-related data of the service type, by adopting a feature extraction network to extract the POI service representation in the service-related data of each target POI; and determining the POI representation data between the target POIs based on the POI service representation of each target POI, by introducing an average fully connected layer to process the POI service representation of each target POI.

6. The electrical device of claim 5, wherein constructing the first relation edge between the POI node of the candidate POI and the keyword node of the service keyword based on the consistency of the paradigmatic points to which the candidate POI and the service keyword belong comprises:

constructing a first sub-relation edge between the POI node and a paradigmatic point node of the paradigmatic point based on an ownership of the candidate POI and the paradigmatic point; and constructing a second sub-relation edge between a paradigmatic point node of the paradigmatic point and the keyword node based on an ownership of the paradigmatic point and service keyword.

7. The electrical device of claim 6, the at least one processor is further caused to execute:

constructing a paradigmatic relation edge between paradigmatic point nodes of paradigmatic points to which the candidate POIs belong based on the co-occurrence relation between the candidate POIs;

determining a paradigmatic edge attribute of each paradigmatic relation edge based on connected data between the paradigmatic point nodes connected by the paradigmatic relation edge; and determining a second edge attribute of each second sub-relation edge based on a contribution degree of the service keyword associated with the second sub-relation edge to paradigmatic comment data of the paradigmatic point associated with the second sub-relation edge;

wherein determining the service-related data of the target POIs based on the pre-constructed POI heterogeneous information network further comprises:

respectively determining target paradigmatic point nodes and target keyword nodes associated with the target POIs based on the first sub-relation edge and the second sub-relation edge;

determining service-related data of a paradigmatic type of the target POIs based on the paradigmatic edge attribute between the target paradigmatic point nodes; and determining service-related data of a dissimilar node type of the target POIs based on the second edge attribute between the paradigmatic point node and the target keyword node.

8. The electrical device of claim 7, wherein determining the POI representation data between the target POIs based on the service-related data of each target POI comprises:

determining a POI service representation of each target POI based on the service-related data of the service type and the service-related data of the dissimilar node type;

determining a POI paradigmatic representation of each target POI based on the service-related data of the paradigmatic type and the service-related data of the dissimilar node type;

using the POI paradigmatic representation of one target POI to update the POI service representation of the other target POI; and determining the POI representation data between the target POIs based on the POI service representation of each target POI.

9. A non-transitory computer-readable storage medium having computer instructions stored thereon, wherein the computer instructions are configured to cause a computer to execute the method for determining a competitive relation of POIs, comprising:

determining service-related data of target POIs based on a pre-constructed POI heterogeneous information network, wherein the POI heterogeneous information network is constructed by: extracting service keywords of comment data of a plurality of candidate POIs; and constructing the POI heterogeneous information network based on co-occurrence relations of respective candidate POIs and similarity relations of the service keywords;

determining POI representation data between the target POIs based on the service-related data of the target POIs; and determining a competitive relation between the target POIs based on the POI representation data, wherein constructing the POI heterogeneous information network based on the co-occurrence relations of respective candidate POIs and the similarity relations of the service keywords comprises:

constructing a service relation edge between keyword nodes of the service keywords based on the similarity relation of the service keywords;

constructing a first relation edge between a POI node of the candidate POI and the keyword node of the service keyword based on a consistency of paradigmatic points to which the candidate POI and the service keyword belong; and determining a service edge attribute of each service relation edge based on a similarity between the service keywords associated with the service relation edge, wherein the similarity between the service keywords indicates a semantic similarity between the service keywords;

wherein determining the service-related data of the target POIs based on the pre-constructed POI heterogeneous information network comprises:

determining target keyword nodes associated with the target POIs based on the first relation edge and the service relation edge in the POI heterogeneous information network; and determining service-related data of a service type of the target POIs based on the service edge attribute of the service relation edge between the target keyword nodes, wherein determining the POI representation data between the target POIs based on the service-related data of the target POIs comprises:

determining a POI service representation of each target POI based on the service-related data of the service type, by adopting a feature extraction network to extract the POI service representation in the service-related data of each target POI; and determining the POI representation data between the target POIs based on the POI service representation of each target POI, by introducing an average fully connected layer to process the POI service representation of each target POI.

* * * * *